US010649727B1

(12) United States Patent
Douglas et al.

(10) Patent No.: US 10,649,727 B1
(45) Date of Patent: May 12, 2020

(54) WAKE WORD DETECTION CONFIGURATION

(71) Applicant: Amazon Technologies, Inc., Seattle, WA (US)

(72) Inventors: Michael Douglas, Redmond, WA (US); Deepak Suresh Yavagal, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/979,246

(22) Filed: May 14, 2018

(51) Int. Cl.
*G06F 3/16* (2006.01)
*G10L 15/08* (2006.01)
*G10L 15/22* (2006.01)
*H04L 29/08* (2006.01)

(52) U.S. Cl.
CPC .............. *G06F 3/167* (2013.01); *G10L 15/08* (2013.01); *G10L 15/22* (2013.01); *H04L 67/34* (2013.01); *G10L 2015/088* (2013.01)

(58) Field of Classification Search
CPC ......... G06F 3/167; G10L 15/08; G10L 15/22; G10L 2015/088; H04L 67/34
USPC ....................................................... 704/254
See application file for complete search history.

(56) References Cited

U.S. PATENT DOCUMENTS

| 10,057,647 | B1* | 8/2018 | Marconcini | H04N 21/436 |
| 10,192,546 | B1* | 1/2019 | Piersol | G10L 15/08 |
| 2013/0282564 | A1* | 10/2013 | Sibbald | H04M 1/72525 705/39 |
| 2015/0015505 | A1* | 1/2015 | Lee | G06F 3/167 345/173 |
| 2015/0248885 | A1* | 9/2015 | Koulomzin | G10L 15/08 704/251 |
| 2018/0032997 | A1* | 2/2018 | Gordon | G06Q 20/3224 |
| 2018/0040324 | A1* | 2/2018 | Wilberding | H05B 37/02 |
| 2018/0061419 | A1* | 3/2018 | Melendo Casado | G10L 15/22 |
| 2018/0146233 | A1* | 5/2018 | Satheesh | G06F 3/0482 |
| 2018/0277113 | A1* | 9/2018 | Hartung | G10L 15/22 |
| 2019/0149987 | A1* | 5/2019 | Moore | H04W 76/10 |

* cited by examiner

*Primary Examiner* — Edwin S Leland, III
(74) *Attorney, Agent, or Firm* — Lee & Hayes, P.C.

(57) ABSTRACT

Systems and methods for wake word detection configuration are disclosed. An electronic device may be configured to detect a wake word in a user utterance based on one or more wake word models. Upon detection, wake word APIs may be utilized to determine if a speech-processing application associated with a remote speech-processing system is installed on the device. If installed, secondary wake word detection may be performed on the audio data representing the user utterance, and if the wake word is detected, the audio data may be sent to the remote system for processing. If not installed, a display of the electronic device may present options for downloading the speech-processing application.

20 Claims, 10 Drawing Sheets

WAKE WORD DETECTION CONFIGURATION

BACKGROUND

Electronic devices, such as mobile phones, typically rely on tactile inputs such as touchscreen inputs and/or button actuations to perform operations. Additional input means may be desired. Described herein are improvements in technology and solutions to technical problems that can be used to, among other things, increase the availability of non-tactile input means for electronic device users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
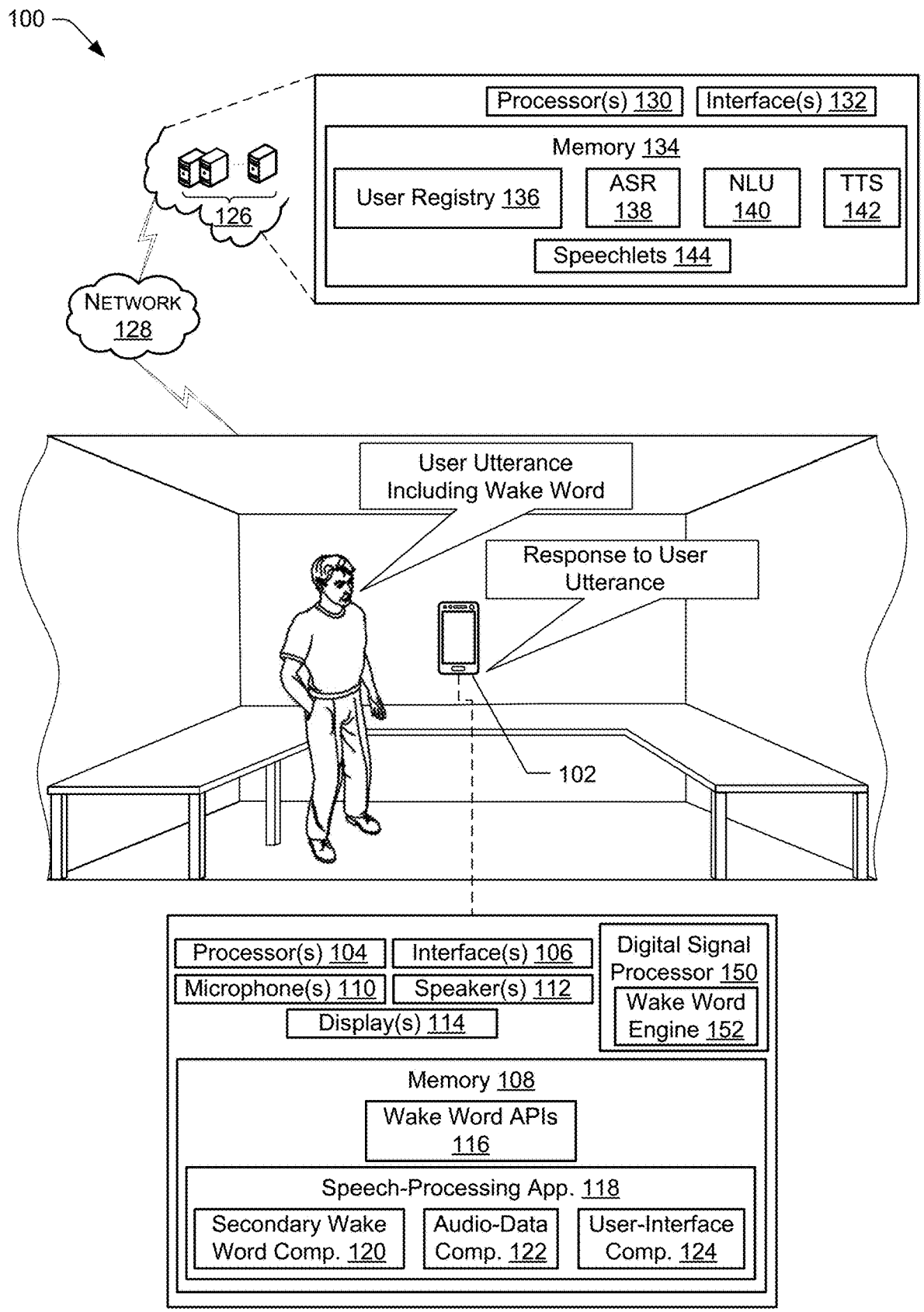
FIG. 1 illustrates a schematic diagram of an example environment for wake word detection configuration.

Systems and methods for wake word detection configuration are described herein. Take, for example, an electronic device, such as a mobile phone, that includes components that facilitate the detection of wake words from user utterances. The electronic device may include a microphone that may be configured to capture audio representing the user utterance and generate corresponding audio data. The electronic device may also include a digital signal processor and a digital-signal-processor component configured to cause the digital signal processor to detect a wake word in the audio data. The electronic device may also have stored thereon one or more wake word application programming interfaces (APIs) that are associated with a remote speech-processing system. When the digital signal processor, using the digital-signal-processor component, detects the wake word, an indication that the wake word has been detected may be sent to the wake word APIs along with the audio data.

The wake word APIs may determine whether a speech-processing application associated with the remote speech-processing system has been installed on the electronic device. To illustrate, in examples, the electronic device, and/or portions thereof, may be manufactured and pre-programmed to include the digital-signal-processor component and the wake word APIs. These applications may be considered "privileged" or otherwise may be separated from "non-privileged" applications and/or memory. However, the speech-processing application may not be pre-programmed into memory of the electronic device. As such, the wake word APIs may, based at least in part on receiving an indication that a user utterance includes the wake word, determine whether the speech-processing application has been installed.

In examples where the speech-processing application has not been installed, the wake word APIs, and/or one or more other components of the electronic device, may be configured to cause a display of the electronic device to display a selectable link and/or another form of a request for a user of the electronic device to install the speech-processing application, such as from an application store available to the electronic device. A user may provide an input selecting the link, which may cause the application store to open and display one or more options for installing the speech-processing application. In these examples where the speech-processing application has not been installed, the audio data provided at the digital-signal processing application may be deleted or otherwise removed from a buffer of audio data. The user may provide input for initiating installation of the speech-processing application.

In examples where the speech-processing application has been installed, either using the process described above or otherwise, the wake word APIs may be utilized to provide the audio data to the speech-processing application. In examples, the audio data may be tagged or indications may otherwise be provided along with the audio data indicating which portion of the audio data corresponds to the wake word and which portion of the audio data represents the remainder of the user utterance. In addition to the audio data, the wake word APIs may be utilized to send, to the speech-processing application, status data associated with the electronic device. The status data may include capability data indicating that the electronic device is hands-free capable, language data indicating a language that the electronic device is configured to operate in, and/or wake word detection-state data indicating that wake word detection is enabled or disabled on the electronic device.

The speech-processing application may analyze the portion of the audio data corresponding to the wake word to confirm that the wake word is included in the user utterance or to determine that the wake word was not included. For example, the digital signal processor of the electronic device may operate in a low-power or low-capabilities state that may result in the wake word being detected by the digital signal processor at a reduced confidence as compared to processing performed at a higher power or with increased capabilities. As such, a wake word component of the speech-processing application may process the portion of the audio data corresponding to the wake word to perform a check that the wake word is included in the user utterance. If the wake word component determines that the portion of the audio data does not include the wake word, such as at or above a threshold confidence level, the process may end and the audio data may be deleted or otherwise removed from the electronic device. In this way, false-positive wake word determinations by the digital signal processor may be made. If the wake word component determines that the portion of the audio data includes the wake word, such as at or above the threshold confidence level, an audio-data component of the speech-processing application may format or otherwise prepare the audio data to be sent to the remote speech-processing system for speech processing. The remote system may process the audio data and may generate directive data representing a directive for the electronic device to perform in response to the user utterance. The directive may be for the electronic device to output requested audio, display requested content, and/or one or more other actions.

Additionally, or alternatively, the wake word APIs may be configured to receive data from the speech-processing application, such as wake word model data representing one or more wake word models. The wake word APIs may provide all or a portion of the wake word model data to the digital-signal-processor component for use in detecting the wake word. The wake word model data may be updated, and/or new wake word model data may be provided, by the remote system, such as at the speech-processing application.

Additionally, or alternatively, the speech-processing application may be configured to cause presentation, using a display associated with the electronic device, of one or more control settings controlling enablement and disablement of wake word detection by the electronic device. For example, the speech-processing application may cause a user interface to be displayed on the display of the electronic device, and the user interface may include functionality that allows the user to provide input associated with the one or more control settings. The user may provide input associated with the control settings. Input data corresponding to the user input may be generated and may cause the wake word-detection capabilities of the electronic device to be enabled or disabled.

Additionally, or alternatively, in examples, the wake word APIs and the speech-processing application may be pre-programmed in memory of the electronic device. In these examples, when a user first turns on the electronic device and/or interacts with the electronic device, the user may be prompted to configure and/or otherwise setup the device for first use. For example, setup options may be displayed on the display of the electronic device. At least one of the setup options may request input from the user regarding enabling wake word detection. The user may provide input indicating a desire to enable wake word detection. In this way, the out-of-the-box experience for the user may include enabling wake word detection without additional input from the user at a later time to enable wake word detection or speech processing by the remote system.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for wake word detection configuration. The system 100 may include, for example, an electronic device 102. While the electronic device 102 is depicted as a mobile phone, it should be understood that the electronic device 102 may be any device capable of sending and receiving audio data and/or displaying information to a user of the electronic device 102. The electronic device 102 may include components such as, for example, one or more processors 104, one or more network interfaces 106, memory 108, one or more microphones 110, one or more speakers 112, and/or one or more displays 114. The microphones 110 may be configured to capture audio, such as user utterances, and generate corresponding audio data. The speakers 112 may be configured to output audio, such as in response to receiving audio data and/or directive data from a remote system 126 using a network 128. The displays 114 may be configured to visually present information to a user. The memory 108 may include one or more components such as, for example, one or more wake word APIs 116, and a speech-processing application 118. The speech-processing application 118 may include components such as, for example, a secondary wake word component 120, an audio-data component 122, and/or a user-interface component 124. Each of the components of the memory 108 will be described in detail below with reference to an example use of the environment 100. Additionally, the electronic device 102 may include a digital signal processor 150, which may include a wake word engine 152.

The environment 100 may additionally include the remote system 126, which may be configured to receive and send data between the remote system 126 and the electronic device 102. The remote system 126 may include components such as, for example, one or more processors 130, one or more network interfaces 132, and memory 134. The components of the memory 134 may include, for example, a user registry 136, an automatic speech recognition (ASR) component 138, a natural language understanding (NLU) component 140, a text-to-speech component 142, and/or one or more speechlets 144. The components of the memory 134 are described in detail below with reference to an example use of the environment 100.

For example, the electronic device 102 may include a digital signal processor 150 and a wake word engine 152 configured to cause the digital signal processor 150 to detect a wake word in the audio data. The electronic device 102 may also have stored thereon the one or more wake word APIs 116 that are associated with a remote speech-processing system 126. When the digital signal processor 150, using the wake word engine 152, detects the wake word, an indication that the wake word has been detected may be sent to the wake word APIs 116 along with the audio data.

The wake word APIs 116 may be utilized to determine whether the speech-processing application 118 associated with the remote speech-processing system 126 has been installed on the electronic device 102. To illustrate, in examples, the electronic device 102, and/or portions thereof, may be manufactured and pre-programmed to include a digital-signal-processor component and the wake word APIs 116. These applications may be considered "privileged" or otherwise may be separated from "non-privileged" applications and/or memory. However, the speech-processing application 118 may not be pre-programmed into memory of the electronic device 102. As such, the wake word APIs 116 may be utilized to, based at least in part on receiving an indication that a user utterance includes the wake word, determine whether the speech-processing application 118 has been installed. Determining whether the speech-processing application 118 has been installed may include, for example, one or more components of the electronic device 102 sending a call to a portion of the electronic device 102 indicated to be associated with a speech-processing application 118. This portion of the electronic device 102 may include the non-privileged memory and/or applications. The call may be configured to query the memory for the presence of the speech-processing application 118 and/or to request data from the speech-processing application 118. When the call results in identifying the speech-processing application 118, and/or a response is received that is associated with the speech-processing application 118, the speech-processing application 118 may be determined to be downloaded on the electronic device 102. In examples where the call results in not identifying the speech-processing application 118, and/or a response is received that indicates the speech-processing application 118 is not installed, the speech-processing application 118 may be determined to be absent from the electronic device 102.

In examples where the speech-processing application 118 has not been installed, the wake word APIs 116, and/or one or more other components of the electronic device 102, may be configured to cause a display 114 of the electronic device 102 to display a selectable link and/or another form of a request for a user of the electronic device 102 to install the speech-processing application 118, such as from an application store available to the electronic device 102. A user may provide an input selecting the link, which may cause the application store to open and display one or more options for installing the speech-processing application 118. In these examples where the speech-processing application 118 has not been installed, the audio data provided by the digital-signal-processor component may be deleted or otherwise removed from the memory 108. The user may provide input for initiating installation of the speech-processing application 118.

In examples where the speech-processing application 118 has been installed, either using the process described above or otherwise, the wake word APIs 116 may be utilized to provide the audio data to the speech-processing application 118. In examples, the audio data may be tagged or indications may otherwise be provided along with the audio data indicating which portion of the audio data corresponds to the wake word and which portion of the audio data represents the remainder of the user utterance. In addition to the audio data, the wake word APIs 116 may be utilized to send, to the speech-processing application 118, status data associated with the electronic device 102. The status data may include capability data indicating that the electronic device 102 is hands-free capable, language data indicating a language that the electronic device 102 is configured to operate in, and/or wake word-detection-state data indicating that wake word detection is enabled or disabled on the electronic device 102. It should be understood that the wake word APIs 116 may include APIs and/or may be associated with other components, such as one or more containers, one or more applications, one or more databases, one or more models, and/or one or more libraries.

The speech-processing application 118 may analyze the portion of the audio data corresponding to the wake word to confirm that the wake word is included in the user utterance or to determine that the wake word was not included. For example, the digital signal processor 150 of the electronic device 102 may operate in a low-power or low-capabilities mode that may result in the wake word being detected by the digital signal processor 150 at a reduced confidence as compared to processing performed at a higher power or with increased capabilities. As such, the secondary wake word component 120 of the speech-processing application 118 may process the portion of the audio data corresponding to the wake word to perform a check that the wake word is included in the user utterance. If the secondary wake word component 120 determines that the portion of the audio data does not include the wake word, such as at or above a threshold confidence level, the process may end and the audio data may be deleted or otherwise removed from the electronic device 102. For example, the secondary wake word component 120 may analyze characteristics of the portion of the audio data corresponding to the wake word as identified by the digital signal processor in comparison to one or more reference characteristics associated with audio data including the wake word. The characteristics of the sample audio data may be compared to the reference characteristics, which may be associated with one or more wake word models, to determine if the sample audio data contains the wake word, such as to at least the threshold confidence level. For example, the analysis performed by the secondary wake word component 120 may indicate that the audio data includes the wake word to a 95% confidence level. If the threshold confidence level is set to 95% or more, it may be determined that the audio data includes the wake word. It should be understood that the confidence level and threshold confidence level described in this example are used by way of illustration only and not as a limitation. The confidence levels and threshold confidence levels may vary and/or may be described in ways other than percentages. In these examples where the wake word is not detected by the secondary wake word component 120 to at or above the threshold confidence level, the speech-processing application 118 may disregard the remainder of the audio data, such as by deleting it or otherwise removing it from memory associated with the speech-processing application 118.

If the secondary wake word component 120 determines that the portion of the audio data includes the wake word, such as at or above the threshold confidence level, the audio-data component 122 of the speech-processing application 118 may format or otherwise prepare the audio data to be sent to the remote speech-processing system 126 for speech processing. Formatting of the audio data may include audio beamforming, signal optimization, and/or association of metadata associated with the audio data, for example. The ASR component 138 of the remote system 126 may process the audio data to generate text data corresponding to the audio data. The NLU component 140 of the remote system 126 may utilize the text data to generate intent data associated with the user utterance. The intent data may be utilized to select and/or utilize the one or more speechlets 144, which may be utilized to generate directive data representing a directive for the electronic device 102 to perform in response to the user utterance. The directive may be for the electronic device 102 to output requested audio, display requested content, and/or one or more other actions. In examples where the directive data indicates a directive for the electronic device 102 to output audio representing a verbal response to the user, the TTS component 142 may be utilized to generate audio data representing the response. The functionality of the ASR component 138, the NLU component 140, and the TTS component 142 are described in more detail below with respect to FIG. 9.

Additionally, or alternatively, the wake word APIs 116 may be configured to receive data from the speech-processing application 118, such as wake word-enrollment data representing a wake word to be enrolled for detection by the digital signal processor 150 wake word. The wake word APIs 116 may provide all or a portion of the wake word-enrollment data to the digital-signal-processor component and/or the wake word engine 152 for use in detecting the wake word.

Additionally, or alternatively, the speech-processing application 118 may be configured to cause presentation, using the display 114, of one or more control settings controlling enablement and disablement of wake word detection of the electronic device 102. For example, the user-interface component 124 of the speech-processing application 118 may cause a user interface to be displayed on the display 114 of the electronic device 102, and the user interface may include functionality that allows the user to provide input associated with the one or more control settings. The user may provide input associated with the control settings. Input data corresponding to the user input may be generated and may cause the wake word-detection capabilities of the electronic device 102 to be enabled or disabled. For example, the speech-processing application 118 may, using the wake word APIs 116, send an instruction to the digital-signal-processor component that may cause the digital-signal-processor component, or a portion thereof, to disable the always-on feature of the microphones, and/or to refrain from instructing the digital signal processor from processing audio data, and/or refrain from sending audio data and/or indications of wake word detection to the speech-processing application 118.

Additionally, or alternatively, in examples, the wake word APIs 116 and the speech-processing application 118 may be pre-programmed in memory 108 of the electronic device 102. In these examples, when a user first turns on the electronic device 102 and/or interacts with the electronic device 102, the user may be prompted to configure and/or otherwise setup the device 102 for first use. For example, setup options may be displayed on the display 114 of the electronic device 102. At least one of the setup options may request input from the user regarding enabling wake word detection. The user may provide input indicating a desire to enable wake word detection. In this way, the out-of-the-box experience for the user may include enabling wake word detection without additional input from the user at a later time to enable wake word detection or speech processing by the remote system 126.

The user registry 136 of the remote system 126 may be configured to identify, determine, and/or generate associations between users, user profiles, user accounts, and/or devices. For example, one or more associations between user profiles and user accounts may be identified, determined, and/or generated by the user registry 136. The user registry 136 may additionally store information indicating one or more applications accessible to and/or enabled for a given user profile and/or user account. The user registry 136 may further store information indicating which devices have installed thereon the speech-processing application 118 and/or which version of the speech-processing application 118 is installed on a given device. It should also be understood that a user account may be associated with one or more than one user profiles.

As used herein, a processor, such as processor(s) 104 and/or 130, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 104 and/or 130 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 104 and/or 130 may possess its own local memory, which also may store program components, program data, and/or one or more operating systems.

The memory 108 and/or 134 may include volatile and nonvolatile memory, removable and non-removable media implemented in any method or technology for storage of information, such as computer-readable instructions, data structures, program component, or other data. Such memory 108 and/or 134 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 104 and/or 130 may be implemented as computer-readable storage media ("CRSM"), which may be any available physical media accessible by the processor(s) 104 and/or 130 to execute instructions stored on the memory 108 and/or 134. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108 and/or 134, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 106 and/or 132 may enable communications between the components and/or devices shown in system 100 and/or with one or more other remote systems, as well as other networked devices. Such network interface(s) 106 and/or 132 may include one or more network interface controllers (NICs) or other types of transceiver devices to send and receive communications over the network 128.

For instance, each of the network interface(s) 106 and/or 132 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 106 and/or 132 may include a wide area network (WAN) component to enable communication over a wide area network.

Figure 2:
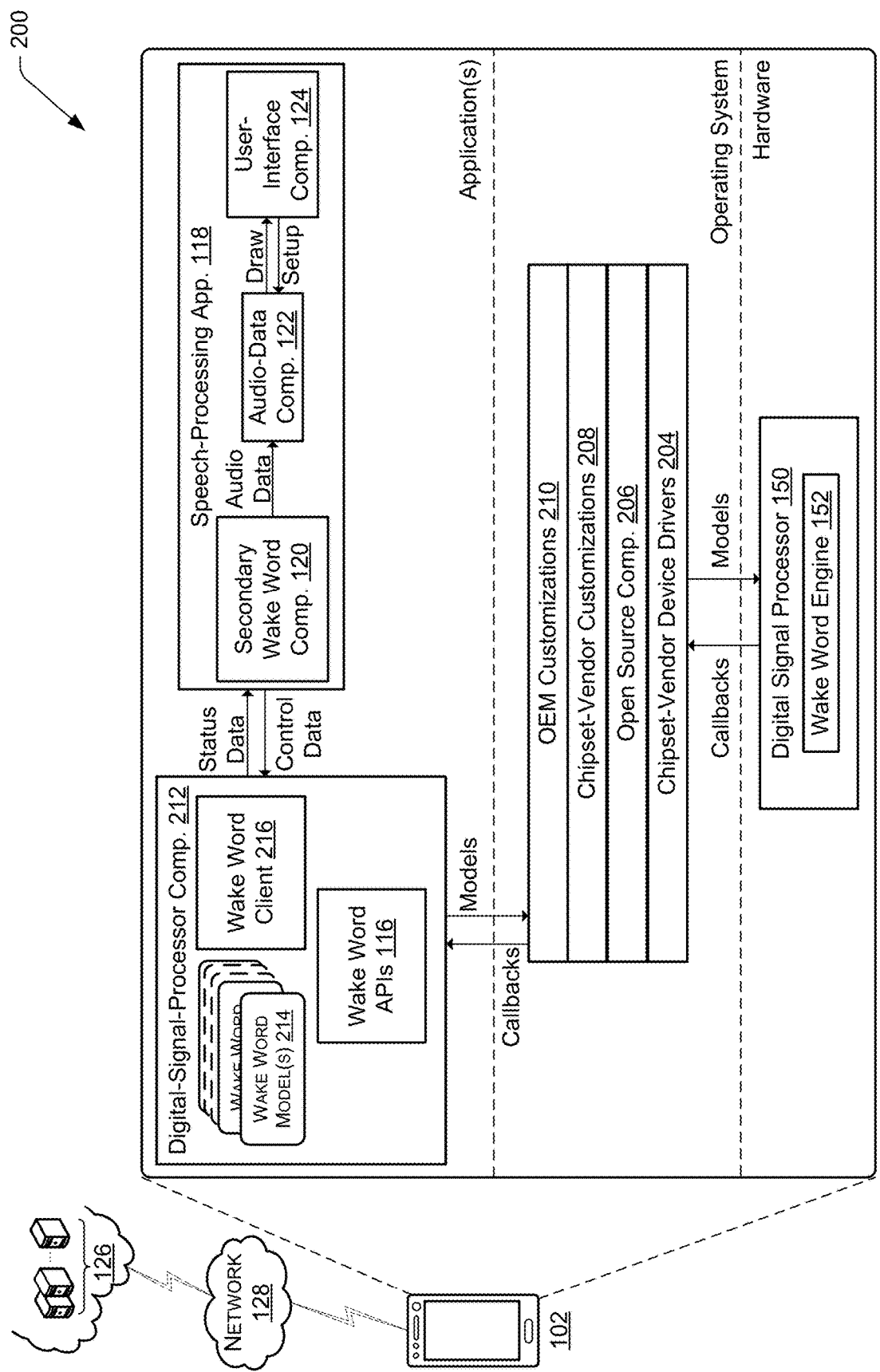
FIG. 2 illustrates a conceptual diagram of components of an electronic device having stored in memory one or more applications for wake word detection configuration.

FIG. 2 illustrates a conceptual diagram of components of an electronic device 102 having stored in memory one or more applications for wake word detection configuration. As shown in FIG. 2, the electronic device 102 may include the same or similar components as those described with respect to FIG. 1. Additionally, the electronic device 102 of FIG. 2 may be configured to perform the same or similar functionality as the electronic device 102 of FIG. 1. The electronic device 102 may be configured to send and/or receive data with the remote system 126, such as using the network 128. The electronic device 102 may include a number of components, which may include hardware, an operating system, and/or one or more applications. Example components of each are described below.

For example, the electronic device 102 may include a digital signal processor 150, which may be configured to send and receive information, such as sending callbacks and/or receiving models with components of the operating system. The digital signal processor 150 may utilize a wake word engine 152 to detect a wake word from audio data. The operating system may include one or more chipset-vendor device drivers 204, an open source component 206, chipset-vendor customizations 208, and/or original equipment manufacturer (OEM) customizations 210. The components of the operating system may send and/or receive callbacks and/or models associated with detection of a wake word, as described herein. For example, the operating system may send callbacks to the digital-signal-processor component 212 when audio data is received. The OEM customizations 210 and/or chipset-vendor customizations 208 may allow the digital signal processor 150 to send and receive callbacks from the digital-signal-processor component 212 such that the digital signal processor 150 may analyze the received audio data. The open source component 206 may provide and/or utilizes frameworks and/or libraries corresponding to the operating system to enable communication between the digital signal processor 150 and the applications.

The digital-signal-processor component 212 may include one or more wake word models 214, a wake word client 216, and the wake word APIs 116. As described herein, the wake word APIs 116 may be utilized to provide the one or more wake word models 214 and/or to replace a wake word model with another wake word model and/or to provide wake word-enrollment data. The wake word model(s) 214 may be utilized in connection with the wake word engine 152 to cause the digital signal processor 150 to determine if a wake word is present in the audio data. If the digital signal processor 150, using the wake word engine 152 and/or the wake word model(s) 214, determines that the audio data includes the wake word, an interrupt may be generated and sent to the wake word client 216. The wake word client 216 may utilize the wake word APIs 116 to determine if the speech-processing application 118 associated with the remote system 126 has been installed on the electronic device 102.

As illustrated in FIG. 2, the speech-processing application 118 has been installed on the electronic device 102, and in these examples, the audio data may be sent to the secondary wake word component 120 of the speech-processing application 118. The secondary wake word component 120 may perform a check to determine if the wake word is present in the audio data to a threshold confidence level. When present, the audio data may be sent to the audio-data component 122, which may, for example, format the audio data to be sent to the remote system 126. The user-interface component 124 may be utilized to display one or more user interfaces for controlling wake word detection and/or speech processing, as described herein.

It should be understood that while FIG. 2 depicts the digital-signal-processor component 212 and the speech-processing application 118 as two components residing on the same memory or section of memory, the digital-signal-processor component 212 may reside on one memory and/or a portion of memory and the speech-processing application 118 may reside on another memory and/or another portion of the memory. For example, the digital-signal-processor component 212 may be associated with memory that is "privileged," while the speech-processing application 118 may reside in a "non-privileged" portion of the memory and/or on another memory. Additionally, the instructions associated with the digital-signal-processor component 212 may cause the digital signal processor 150 to perform the operations described with respect to the digital-signal-processor component 212, while the instructions associated with the speech-processing application 118 may cause another processor to perform the operations described with respect to the speech-processing application 118. In some examples, the components of the hardware, operating system, and/or application(s) may be placed on and/or be associated with a single chip, or some of the components may reside on another chip. For example, the speech-processing application 118 may reside on a separate chip from the digital-signal-processor component 212.

Figure 3:
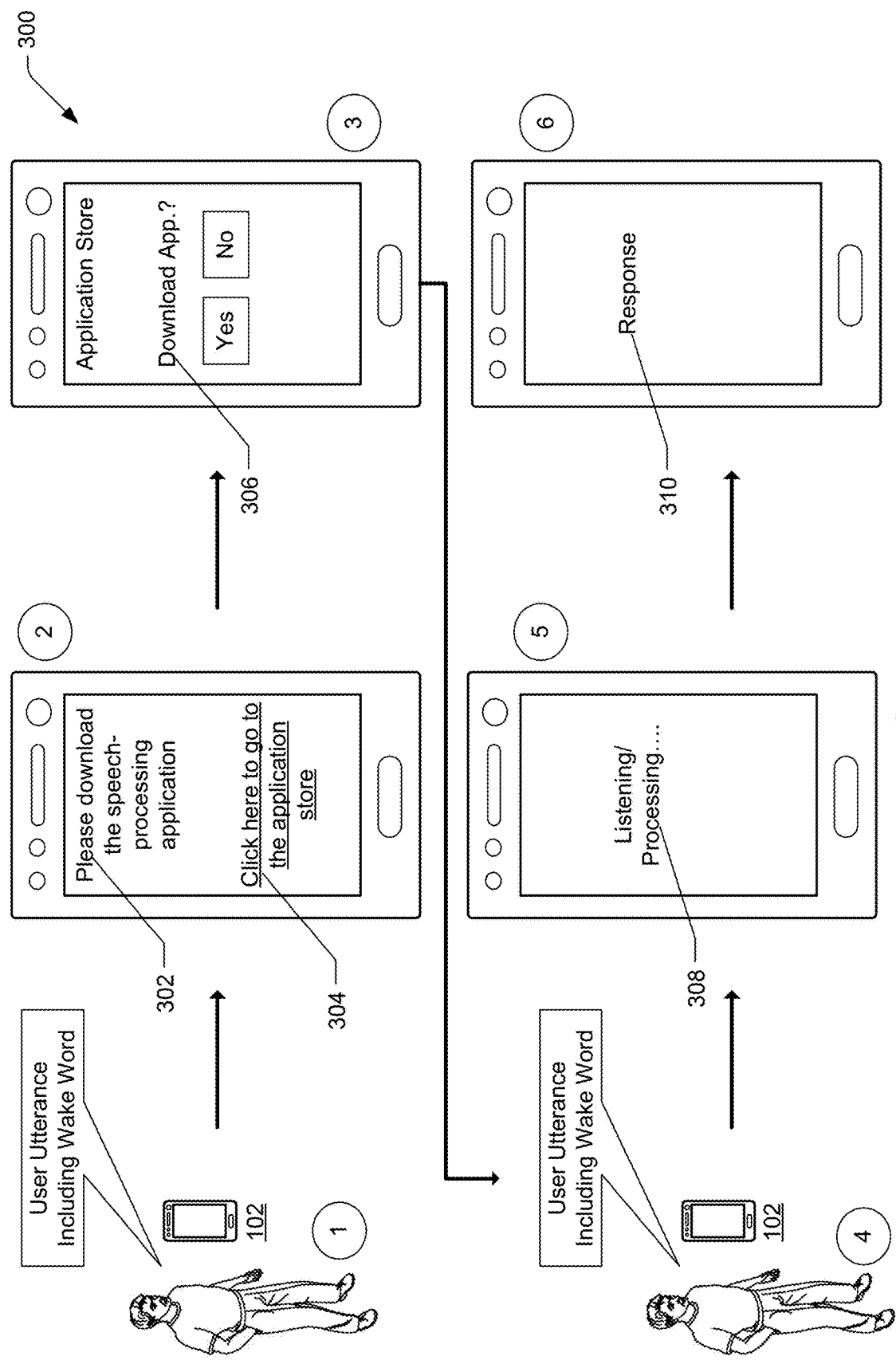
FIG. 3 illustrates a progression of user interfaces depicting wake word detection configuration.

FIG. 3 illustrates a progression of user interfaces depicting wake word detection configuration. The example environment 300 of FIG. 3 depicts an electronic device 102 with a microphone that may be "always-on" or otherwise configured to capture audio continuously and/or periodically. FIG. 3 illustrates a progression, from left to right and from top to bottom, as indicated, of a user experience associated with wake word detection configuration as described herein.

For example, at step 1, a user may speak a user utterance, which may be captured by the microphone of the electronic device 102. Corresponding audio data may be generated and may be analyzed by a digital signal processor, using a digital-signal-processor component, to determine if the audio data includes a wake word. The digital signal processor may determine that the wake word is present, and in these examples, an indication that the digital signal processor has determined that the wake word is present may be sent to wake word APIs associated with a remote speech-processing system. The wake word APIs may be utilized to determine if a speech-processing application has been installed on the electronic device 102.

If the speech-processing application has not been installed, then at step 2, the wake word APIs and/or another component of the electronic device 102 may cause the display of the electronic device 102 to display an indication 302 that the speech-processing application is not installed along with a selectable portion 304, such as a link, that when selected may cause an application store to open on the electronic device 102.

In examples where the user provides input corresponding to selection of the selectable portion 304, such as by a touch input to a portion of the display corresponding to the selectable portion 304, at step 3, the display may present the application store along with a request 306 to download the speech-processing application. Upon selection of an option to confirm downloading of the speech-processing application, the speech-processing application may be downloaded and installed on the electronic device 102.

At step 4, a user may speak another user utterance, which may be captured by the microphone of the electronic device 102. Corresponding audio data may be generated and may be analyzed by the digital signal processor, using the digital-signal-processor component, to determine if the audio data includes the wake word. The digital signal processor may determine that the wake word is present, and in these examples, an indication that the digital signal processor has determined that the wake word is present may be sent to the wake word APIs. The wake word APIs may be utilized to determine if the speech-processing application has been installed on the electronic device 102.

Having installed the speech-processing application, such as at step 3 described above, the wake word APIs may be utilized, at step 5, to determine that the speech-processing application is installed. Based at least in part on determining that the speech-processing application has been installed, a processing indicator 308 may be displayed on the display of the electronic device 102. The processing indicator 308 may provide a visual indication that the electronic device 102 is ready to receive additional audio data corresponding to the user utterance, such as a command, and/or that the remote system is processing the user utterance. Additionally, or alternatively, an audible indication that the electronic device 102 is ready to receive the additional audio data and/or that the remote system is processing the user utterance may be provided.

At step 6, a response 310, such as to the user utterance, may be displayed on the display of the electronic device 102. For example, the response 310 may include text representing a response to a request for information. The response 310 may additionally, or alternatively, include text representing a status of the request, such as completed, not completed, or asking the user for more information. The response 310 may additionally, or alternatively, include display of images requested by the user and/or that are associated with the user utterance. Additionally, or alternatively, audio may be output, such as by one or more speakers of the electronic device 102. The audio may include the response 310 and/or audio requested to be output by the user.

Figure 4:
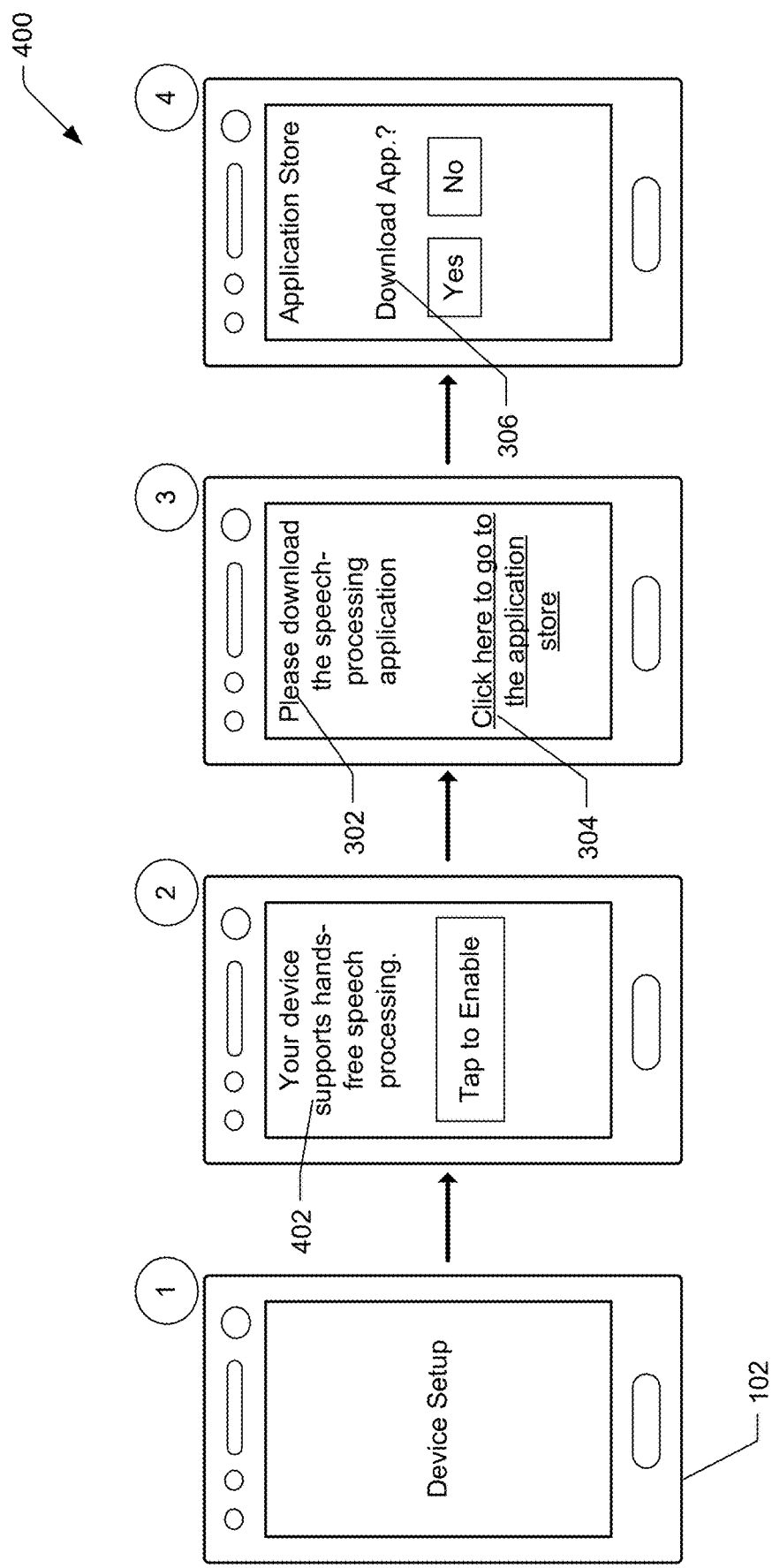
FIG. 4 illustrates a progression of user interfaces depicting device wake word detection configuration.

FIG. 4 illustrates a progression of user interfaces depicting device wake word detection configuration. The example environment 400 of FIG. 4 depicts an electronic device 102 with a microphone that may be "always-on" or otherwise configured to capture audio continuously and/or periodically. FIG. 4 illustrates a progression, from left to right, as indicated, of a user experience associated with device wake word detection configuration.

For example, a user may turn on or otherwise initiate the electronic device 102 for first time use. In these examples, when a user first turns on the electronic device 102 and/or interacts with the electronic device 102, the user may be prompted, at step 1, to configure and/or otherwise setup the device 102 for first use. For example, at step 2, setup options 402 may be displayed on the display of the electronic device 102. At least one of the setup options 402 may request input from the user regarding enabling wake word detection. The user may provide input indicating a desire to enable wake word detection. As shown in FIG. 4, the setup option 402 may include text, such as "your device supports hands-free speech processing" and requesting that the user "tap to enable" wake word detection. It should be understood that the example language for the setup option 402 is provided in FIG. 4 by way of example and not by way of limitation. Other language may be utilized. Additionally, or alternatively, the setup option 402 may be presented audibly, such as by the speakers of the electronic device 102.

Upon selection of enabling wake word detection, the electronic device 102 may be configured to detect the wake word. For example, the speech-processing application may already be installed on the electronic device 102 and therefore may be utilized to send audio data to the remote system for speech processing. In other examples, the speech-processing application may not be pre-installed on the device prior to first use setup. In these examples, as step 3, the wake word APIs and/or another component of the electronic device 102 may cause the display of the electronic device 102 to display an indication 302 that the speech-processing application is not installed along with a selectable portion 304, such as a link, that when selected may cause an application store to open on the electronic device 102.

In examples where the user provides input corresponding to selection of the selectable portion 304, such as by a touch input to a portion of the display corresponding to the selectable portion 304, at step 4, the display may present the application store along with a request 306 to download the speech-processing application. It should be understood that one or more intermediary screens may be presented between step 3 and step 4. For example, terms of use may be presented, if applicable, before displaying and/or interacting with the application store. Upon selection of an option to confirm downloading of the speech-processing application, the speech-processing application may be downloaded and installed on the electronic device 102. In this way, the out-of-the-box experience for the user may include enabling wake word detection without additional input from the user at a later time to enable wake word detection or speech processing by the remote system.

FIGS. 5-8 illustrate various processes for wake word detection configuration. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 9, and 10, although the processes may be implemented in a wide variety of other environments, architectures and systems.

Figure 5:
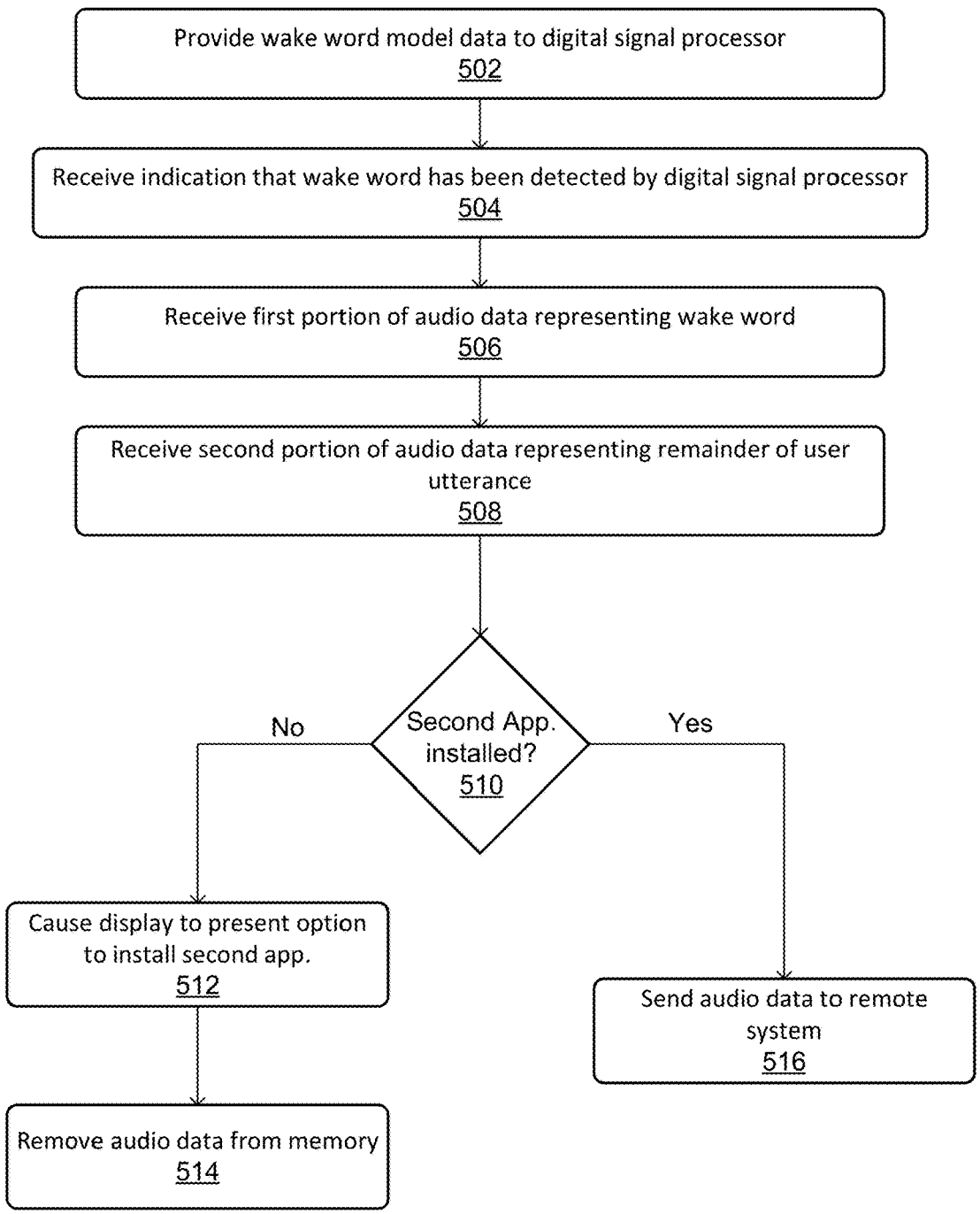
FIG. 5 illustrates a flow diagram of an example process for determining whether a speech-processing application is installed on an electronic device.

FIG. 5 illustrates a flow diagram of an example process 500 for determining whether a speech-processing application is installed on an electronic device. The order in which the operations or steps are described is not intended to be construed as a limitation, and any number of the described operations may be combined in any order and/or in parallel to implement process 500.

At block 502, the process 500 may include providing wake word model data to a first application associated with an electronic device. For example, wake word APIs associated with the electronic device may be configured to receive data from a second application, such as a speech-processing application, of the electronic device, such as wake word model data representing one or more wake word models and/or wake word enrollment data. The wake word APIs may provide all or a portion of the wake word model data and/or the wake word enrollment data to the first application, which may be described as a digital-signal-processor component, for use in detecting a wake word. The wake word model data may be updated, and/or new wake word model data may be provided, by a remote system associated with the wake word APIs, such as by the speech-processing application.

At block 504, the process 500 may include receiving an indication that a wake word has been detected by a digital signal processor associated using the first application. For example, when a digital signal processor of the electronic device, using the first application, detects the wake word, the indication that the wake word has been detected may be sent to the wake word APIs along with, in examples, the audio data.

At block 506, the process 500 may include receiving a first portion of audio data representing the wake word. In examples, the audio data may be received and a determination may be made as to which portion of the audio data corresponds to the wake word. For example, the wake word APIs may receive only the first portion of the audio data representing the wake word and not the remainder of the audio data representing the remainder of the user utterance. In other examples, the audio data may be received by the wake word APIs, and the wake word APIs may be utilized to determine which portion of the audio data corresponds to the wake word.

At block 508, the process 500 may include receiving a second portion of the audio data representing the remainder of the user utterance. In examples, the audio data may be received and a determination may be made as to which portion of the audio data corresponds to the remainder of the user utterance. The second portion of the audio data may be received and/or determined based at least in part on techniques similar to those described with respect to block 506.

At block 510, the process 500 may include determining whether a second application associated with a remote speech-processing system is installed on the electronic device 102. For example, the wake word APIs may be utilized to determine if a speech-processing application has been installed on the electronic device. Additionally, or alternatively, in examples, one or more electronic devices may have installed in memory thereon a custom speech-processing application and/or an outdated speech-processing application. In these examples, the wake word APIs may determine whether an up-to-date and/or non-custom speech-processing application is installed. If not, the up-to-date and/or non-custom speech-processing application may be installed on the electronic device and the previous version of the speech-processing application may be removed and/or otherwise not utilized by the electronic device.

If the second application is not installed on the electronic device, then at block 512, the process 500 may include causing a display of the electronic device to present an option to install the second application. For example, the wake word APIs, and/or one or more other components of the electronic device, may be configured to cause a display of the electronic device to display a selectable link and/or another form of a request for a user of the electronic device to install the speech-processing application, such as from an application store available to the electronic device. A user may provide an input selecting the link, which may cause the application store to open and display one or more options for installing the speech-processing application. The user may provide input for initiating installation of the speech-processing application.

At block 514, the process 500 may include removing the audio data from memory associated with the electronic device. For example, in examples where the speech-processing application has not been installed, the audio data provided by the digital-signal-processor component may be deleted or otherwise removed from the electronic device.

Returning to block 510, if the second application is installed on the electronic device, then at block 516, the process 500 may include sending the audio data, or a portion thereof, to the remote system for speech processing. Metadata indicating which portions of the audio data correspond to the wake word and which portions correspond to the remainder of the user utterance may also be sent along with the audio data, in examples. For example, when the speech-processing application has been installed, either using the process described above or otherwise, the wake word APIs may be utilized to provide the audio data to the speech-processing application. In examples, the audio data may be tagged or indications may otherwise be provided along with the audio data indicating which portion of the audio data corresponds to the wake word and which portion of the audio data represents the remainder of the user utterance. In addition to the audio data, the wake word APIs may be utilized to send, to the speech-processing application, status data associated with the electronic device. The status data may include capability data indicating that the electronic device is hands-free capable, language data indicating a language that the electronic device is configured to operate in, and/or wake word detection state data indicating that wake word detection is enabled or disabled on the electronic device.

Figure 6:
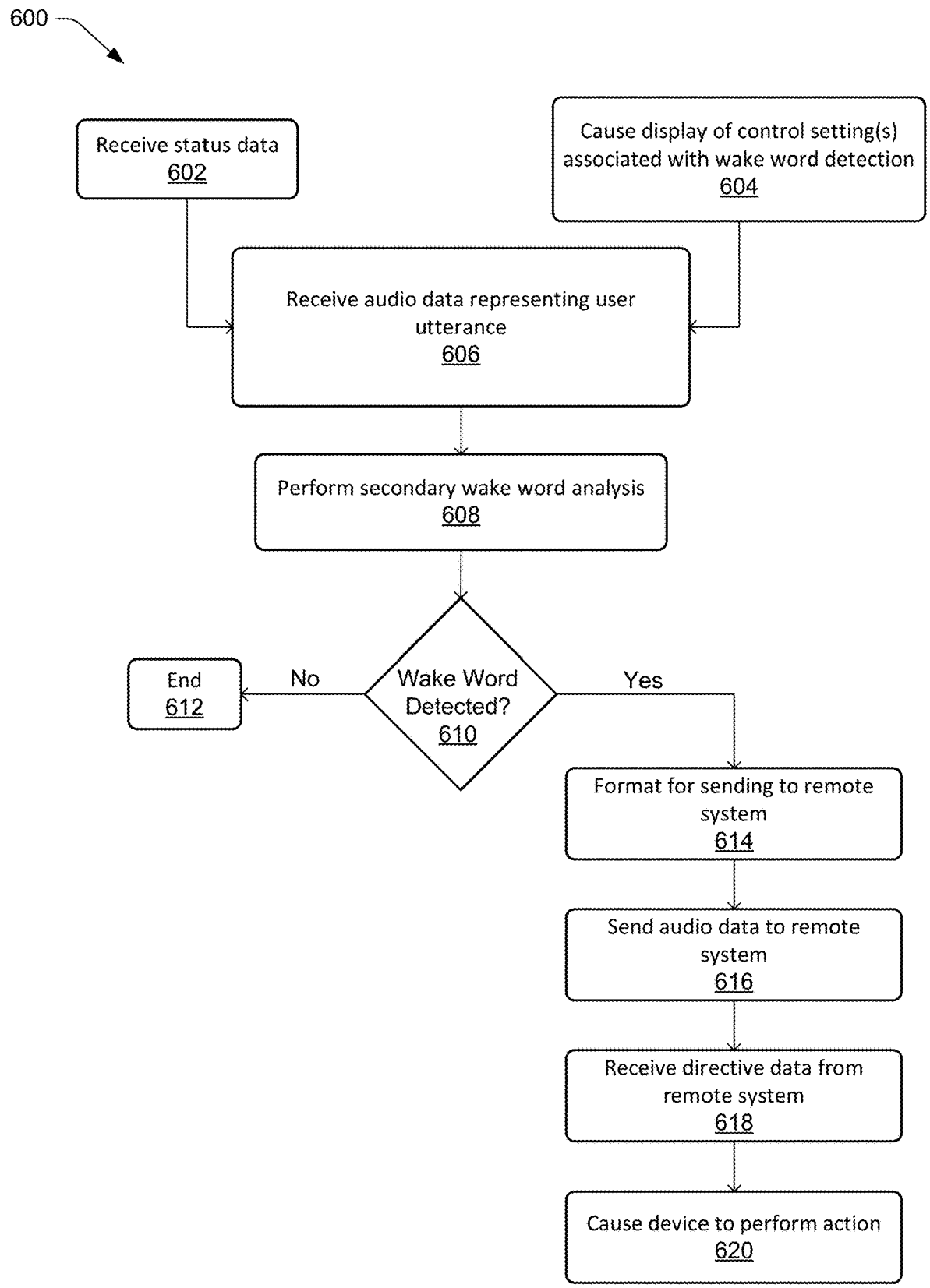
FIG. 6 illustrates a flow diagram of an example process for processing audio data at a speech-processing application installed on an electronic device.

FIG. 6 illustrates a flow diagram of an example process 600 for processing audio data by a speech-processing application installed on an electronic device. The order in which the operations or steps are described is not intended to be construed as a limitation, and any number of the described operations may be combined in any order and/or in parallel to implement process 600.

At block 602, the process 600 may include receiving, at a speech-processing application, status data indicating a status of an electronic device. For example, wake word APIs installed on the electronic device may be utilized to send, to a speech-processing application installed on the electronic device, status data associated with the electronic device. The status data may include capability data indicating that the electronic device is hands-free capable, language data indicating a language that the electronic device is configured to operate in, and/or wake word detection state data indicating that wake word detection is enabled or disabled on the electronic device. In this way, status data may be utilized by the speech-processing application to manage audio data received using the wake word APIs.

At block 604, the process 600 may include causing display of one or more control settings associated with wake word detection. For example, the speech-processing application may be configured to cause presentation, using a display associated with the electronic device, of one or more control settings controlling enablement and disablement of wake word detection of the electronic device. For example, the speech-processing application may cause a user interface to be displayed on the display of the electronic device, and the user interface may include functionality that allows the user to provide input associated with the one or more control settings. The user may provide input associated with the control settings. Input data corresponding to the user input may be generated and may cause the wake word-detection capabilities of the electronic device to be enabled or disabled.

At block 606, the process 600 may include receiving audio data representing a user utterance. For example, the wake word APIs may send the audio data based at least in part on a digital signal processor detecting a wake word in the audio data. The wake word APIs and/or other components of the electronic device may indicate which portion of the audio data corresponds to the wake word and which portion of the audio data corresponds to the remainder of the user utterance.

At block 608, the process 600 may include performing secondary wake word analysis on the audio data. For example, the speech-processing application may analyze at least the portion of the audio data corresponding to the wake word to confirm that the wake word is included in the user utterance or to determine that the wake word was not included. For example, the digital signal processor of the electronic device may operate in a low-power or low-capabilities mode that may result in the wake word being detected by the digital signal processor at a reduced confidence as compared to processing performed at a higher power or with increased capabilities. As such, a secondary wake word component of the speech-processing application may process at least the portion of the audio data corresponding to the wake word to perform a check that the wake word is included in the user utterance.

If the secondary wake word component determines that the portion of the audio data does not include the wake word, such as at or above a threshold confidence level, the process may end and the audio data may be deleted or otherwise removed from the electronic device. For example, the secondary wake word component may analyze characteristics of the portion of the audio data corresponding to the wake word as identified by the digital signal processor in comparison to one or more reference characteristics associated with audio data including the wake word. The characteristics of the sample audio data may be compared to the reference characteristics, which may be associated with one or more wake word models, to determine if the sample audio data contains the wake word, such as to the threshold confidence level. For example, the analysis performed by the secondary wake word component may indicate that the audio data includes the wake word to a 95% confidence level. If the threshold confidence level is set to 95% or more, it may be determined that the audio data includes the wake word. It should be understood that the confidence level and threshold confidence level described in this example is used by way of illustration only and not as a limitation. The confidence levels and threshold confidence levels may vary and/or may be described in ways other than percentages.

At block 610, the process 600 may include determining whether the wake word was detected. As described with respect to block 608, the secondary wake word component may perform the secondary wake word analysis. The secondary wake word component may determine that the wake word was detected when, for example, characteristics of the audio data are similar to reference characteristics of reference audio data, such as to a threshold confidence level.

If the wake word was not detected, such as at or above a threshold confidence level, then at block 612, the process 600 may end. The audio data may be discarded and/or otherwise removed from the speech-processing application and/or memory associated therewith.

Returning to block 610, if the wake word was detected, such as at or above the threshold confidence level, then at block 614, the process 600 may include formatting the audio data for sending to the remote system. Formatting of the audio data may include removing portions of the audio data not corresponding to the user utterance, performing beamforming on the audio data, and/or one or more other techniques described herein with respect to the audio-data component of the electronic.

At block 616, the process 600 may include sending the audio data to the remote system for speech processing. The audio data may be sent, for example, from the speech-processing application of the electronic device to the remote system. The audio data may be sent using the network interfaces and networks described herein.

At block 618, the process 600 may include receiving a directive from the remote system. For example, an ASR component of the remote system may process the audio data to generate text data corresponding to the audio data. The NLU component of the remote system may utilize the text data to generate intent data associated with the user utterance. The intent data may be utilized to select and/or utilize one or more speechlets of the remote system, which may be utilized to generate a directive for the electronic device to perform in response to the user utterance. The directive may be for the electronic device to output requested audio, display requested content, and/or one or more other actions.

At block 620, the process 600 may include causing the device to perform an action based at least in part on the directive. For example, a response, such as to the user utterance, may be displayed on the display of the electronic device. The response may include text representing a response to a request for information. The response may additionally, or alternatively, include text representing a status of the request, such as completed, not completed, or asking the user for more information. The response may additionally, or alternatively, include display of images requested by the user and/or that are associated with the user utterance. Additionally, or alternatively, audio may be output, such as by one or more speakers of the electronic device. The audio may include the response and/or audio requested to be output by the user.

Figure 7:
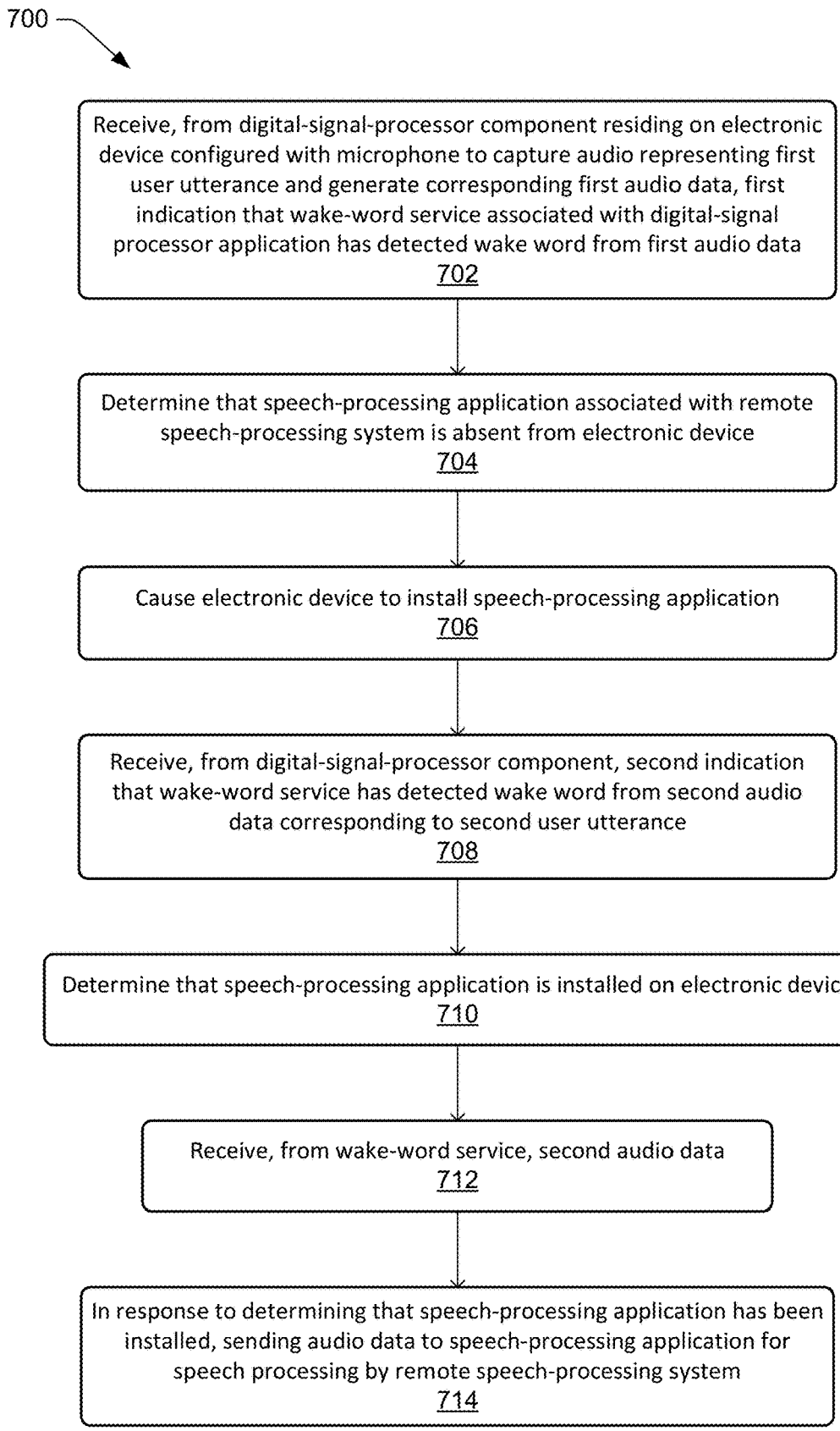
FIG. 7 illustrates a flow diagram of an example process for wake word detection configuration.

FIG. 7 illustrates a flow diagram of an example process 700 for wake word detection configuration. The order in which the operations or steps are described is not intended to be construed as a limitation, and any number of the described operations may be combined in any order and/or in parallel to implement process 700.

At block 702, the process 700 may include receiving, from a digital-signal-processor component residing on an electronic device configured with a microphone to capture audio representing a first user utterance and generate corresponding first audio data, a first indication that a wake word engine associated with the digital-signal processor application has detected a wake word from the first audio data. For example, when a digital signal processor of the electronic device, using a first application such as the digital-signal-processor component, detects the wake word, the indication that the wake word has been detected may be sent to wake word APIs along with, in examples, the audio data. The wake word engine may be a component of the digital-signal-processor component may be configured to utilize one or more wake word models, which may be provided using the wake word APIs, to determine if a user utterance includes a wake word.

At block 704, the process 700 may include determining that a speech-processing application associated with a remote speech-processing system is absent from the electronic device. For example, the wake word APIs may be utilized to determine if a second application, such as the speech-processing application, has been installed on the electronic device. Additionally, or alternatively, in examples, one or more electronic devices may have installed in memory thereon a custom speech-processing application and/or an outdated speech-processing application. In these examples, the wake word APIs may determine whether an up-to-date and/or non-custom speech-processing application is installed. If not, the up-to-date and/or non-custom speech-processing application may be installed on the electronic device and the previous version of the speech-processing application may be removed and/or otherwise not utilized by the electronic device.

At block 706, the process 700 may include causing the electronic device to install the speech-processing application. For example, based at least in part on the second application not being installed on the electronic device, the process 700 may include sending data that may cause a display of the electronic device to present an option to install the second application. For example, the wake word APIs, and/or one or more other components of the electronic device, may be configured to cause a display of the electronic device to display a selectable link and/or another form of a request for a user of the electronic device to install the speech-processing application, such as from an application store available to the electronic device. A user may provide an input selecting the link, which may cause the application store to open and display one or more options for installing the speech-processing application. The user may provide input for initiating installation of the speech-processing application.

At block 708, the process 700 may include receiving, from the digital-signal-processor component, a second indication that the wake word engine has detected the wake word from second audio data corresponding to a second user utterance. Receiving the second indication may be performed in the same or a similar manner to receiving the first indication, as described with respect to block 702.

At block 710, the process 700 may include determining that the speech-processing application is installed on the electronic device. Determining that the speech-processing application is installed on the electronic device may be performed in the same or a similar manner as described with respect to block 704, above.

At block 712, the process 700 may include receiving, from the digital signal processor, the second audio data. In examples, the audio data may be received and a determination may be made as to which portion of the audio data corresponds to the remainder of the user utterance that does not include the wake word.

At block 714, the process 700 may include, in response to determining that the speech-processing application has been installed, sending the audio data to the speech-processing application for speech processing by the remote speech-processing system. For example, when the speech-processing application has been installed, either using the process described above or otherwise, the wake word APIs may be utilized to provide the audio data to the speech-processing application. In examples, the audio data may be tagged or indications may otherwise be provided along with the audio data indicating which portion of the audio data corresponds to the remainder of the user utterance. In addition to the audio data, the wake word APIs may be utilized to send, to the speech-processing application, status data associated with the electronic device. The status data may include capability data indicating that the electronic device is hands-free capable, language data indicating a language that the electronic device is configured to operate in, and/or wake word-detection-state data indicating that wake word detection is enabled or disabled on the electronic device.

The process 700 may additionally, or alternatively, include receiving, such as at the second application which may be described herein as the speech-processing application, the second audio data. The process 700 may also include determining that at least a portion of the second audio data represents the wake word to a threshold confidence level.

For example, the speech-processing application may analyze the audio data to confirm that the wake word is included in the user utterance or to determine that the wake word was not included. For example, the digital signal processor of the electronic device may operate in a low-power or low-capabilities mode that may result in the wake word being detected by the digital signal processor at a reduced confidence as compared to processing performed at a higher power or with increased capabilities. As such, a secondary wake word component of the speech-processing application may process the audio data to perform a check that the wake word is included in the user utterance.

If the secondary wake word component determines that the portion of the audio data does not include the wake word, such as at or above a threshold confidence level, the process may end and the audio data may be deleted or otherwise removed from the electronic device. For example, the secondary wake word component may analyze characteristics of the audio data corresponding to the wake word as identified by the digital signal processor in comparison to one or more reference characteristics associated with audio data including the wake word. The characteristics of the sample audio data may be compared to the reference characteristics, which may be associated with one or more wake word models, to determine if the sample audio data contains the wake word, such as to the threshold confidence level. For example, the analysis performed by the secondary wake word component may indicate that the audio data includes the wake word to a 95% confidence level. If the threshold confidence level is set to 95% or more, it may be determined that the audio data includes the wake word. It should be understood that the confidence level and threshold confidence level described in this example is used by way of illustration only and not as a limitation. The confidence levels and threshold confidence levels may vary and/or may be described in ways other than percentages.

The process 700 may additionally, or alternatively, include receiving input data representing an input associated with a control setting displayed using the speech-processing application, the input indicating selection of an option to disable wake word detection by the electronic device. The process 700 may also include sending, using the speech-processing application and based at least in part on receiving the input data, an instruction to disable the wake word detection to the digital-signal-processor component and causing, using the digital-signal-processor component and based at least in part on the instruction, the wake word detection to be disabled.

The process 700 may additionally, or alternatively, include receiving, from the speech-processing application and at the digital-signal-processor component, wake word enrollment data indicating the wake word to be enrolled for wake word detection.

Figure 8:
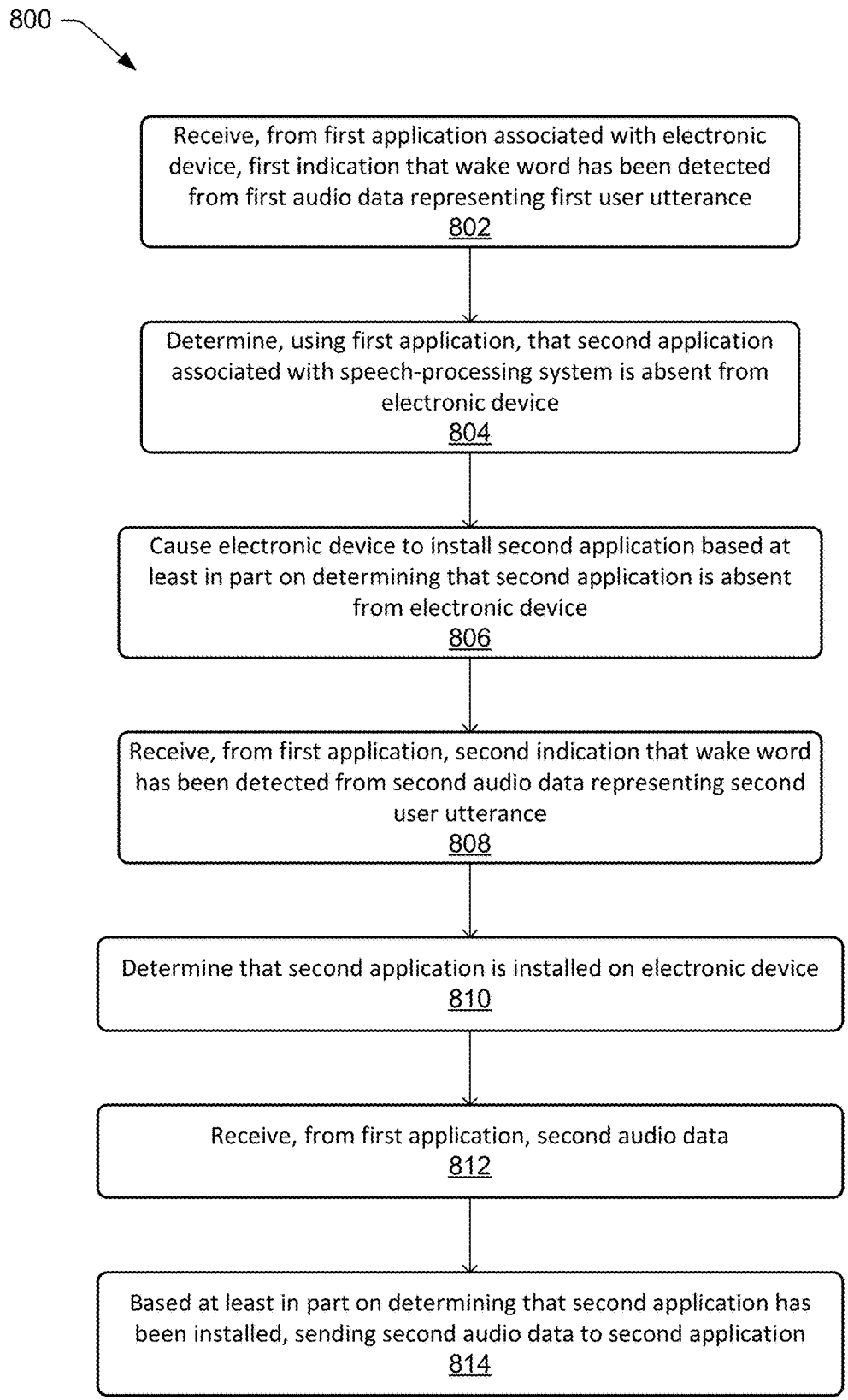
FIG. 8 illustrates a flow diagram of another example process for wake word detection configuration.

FIG. 8 illustrates a flow diagram of another example process for wake word detection configuration. The order in which the operations or steps are described is not intended to be construed as a limitation, and any number of the described operations may be combined in any order and/or in parallel to implement process 800.

At block 802, the process 800 may include receiving, from a first application associated with an electronic device, a first indication that a wake word has been detected from first audio data representing a first user utterance. For example, when a digital signal processor of the electronic device, using the first application such as the digital-signal-processor component, detects the wake word, the indication that the wake word has been detected may be sent to wake word APIs along with, in examples, the audio data. A wake word engine may be a component of the digital-signal-processor component may be configured to utilize one or more wake word models, which may be provided by the wake word APIs, to determine if a user utterance includes a wake word.

At block 804, the process 800 may include determining that a second application associated with a speech-processing system is absent from the electronic device. For example, the wake word APIs may be utilized to determine if a second application, such as the speech-processing application, has been installed on the electronic device. Additionally, or alternatively, in examples, one or more electronic devices may have installed in memory thereon a custom speech-processing application and/or an outdated speech-processing application. In these examples, the wake word APIs may determine whether an up-to-date and/or non-custom speech-processing application is installed. If not, the up-to-date and/or non-custom speech-processing application may be installed on the electronic device and the previous version of the speech-processing application may be removed and/or otherwise not utilized by the electronic device.

At block 806, the process 800 may include causing the electronic device to install the second application based at least in part on determining that the second application is absent from the electronic device. For example, based at least in part on the second application not being installed on the electronic device, the process 800 may include causing a display of the electronic device to present an option to install the second application. For example, the wake word APIs, and/or one or more other components of the electronic device, may be configured to cause a display of the electronic device to display a selectable link and/or another form of a request for a user of the electronic device to install the speech-processing application, such as from an application store available to the electronic device. A user may provide an input selecting the link, which may cause the application store to open and display one or more options for installing the speech-processing application. The user may provide input for initiating installation of the speech-processing application.

At block 808, the process 800 may include receiving, from the first application, a second indication that the wake word has been detected from second audio data representing a second user utterance. Receiving the second indication may be performed in the same or a similar manner to receiving the first indication, as described with respect to block 802.

At block 810, the process 800 may include determining that the second application is installed on the electronic device. Determining that the second application is installed on the electronic device may be performed in the same or a similar manner as described with respect to block 804, above.

At block 812, the process 800 may include receiving, from the first application, second audio data. In examples, the audio data may be received and a determination may be made as to which portion of the audio data corresponds to the wake word and which portion of the audio data corresponds to the remainder of the user utterance that does not include the wake word.

At block 814, the process 800 may include, based at least in part on determining that the second application has been installed, sending the second audio data to the second application. For example, when the second application has been installed, either using the process described above or otherwise, the wake word APIs may be utilized to provide the audio data to the second application. In examples, the audio data may be tagged or indications may otherwise be provided along with the audio data indicating which portion of the audio data corresponds to the remainder of the user utterance. In addition to the audio data, the wake word APIs may be utilized to send, to the second application, status data associated with the electronic device. The status data may include capability data indicating that the electronic device is hands-free capable, language data indicating a language that the electronic device is configured to operate in, and/or wake word detection state data indicating that wake word detection is enabled or disabled on the electronic device.

The process 800 may additionally, or alternatively, include receiving, such as at the second application which may be described herein as the speech-processing application and from the first application, second audio data. The process 800 may also include determining, using the second application, that a portion of the second audio data represents the wake word, such as to a threshold confidence level.

For example, the speech-processing application may analyze the audio data to confirm that the wake word is included in the user utterance or to determine that the wake word was not included. For example, the digital signal processor of the electronic device may operate in a low-power or low-capabilities mode that may result in the wake word being detected by the digital signal processor at a reduced confidence as compared to processing performed at a higher power or with increased capabilities. As such, a secondary wake word component of the speech-processing application may process the portion of the audio data corresponding to the wake word to perform a check that the wake word is included in the user utterance.

If the secondary wake word component determines that the portion of the audio data does not include the wake word, such as at or above a threshold confidence level, the process may end and the audio data may be deleted or otherwise removed from the electronic device. For example, the secondary wake word component may analyze characteristics of the portion of the audio data corresponding to the wake word as identified by the digital signal processor in comparison to one or more reference characteristics associated with audio data including the wake word. The characteristics of the sample audio data may be compared to the reference characteristics, which may be associated with one or more wake word models, to determine if the sample audio data contains the wake word, such as to the threshold confidence level. For example, the analysis performed by the secondary wake word component may indicate that the audio data includes the wake word to a 95% confidence level. If the threshold confidence level is set to 95% or more, it may be determined that the audio data includes the wake word. It should be understood that the confidence level and threshold confidence level described in this example is used by way of illustration only and not as a limitation. The confidence levels and threshold confidence levels may vary and/or may be described in ways other than percentages.

The process 800 may additionally, or alternatively, include receiving input data representing an input associated with the control setting displayed using the second application, the input indicating selection of an option to disable wake word detection by the electronic device. The process 800 may also include sending, using the second application and based at least in part on receiving the input data, an instruction to disable the wake word detection to the first application and causing, using the first application and based at least in part on the instruction, the wake word detection to be disabled.

The process 800 may additionally, or alternatively, include sending, to the first application, wake word model data representing a wake word model associated with at least one of the speech-processing application or the remote system. The wake word model may indicate first audio-data characteristics that correspond to the wake word. In these examples, the first indication that the first audio data includes the wake word may be based at least in part on second audio-data characteristics of the first audio data corresponding to the first audio-data characteristics at or above a threshold comparison level. Additionally, or alternatively, the process 800 may include receiving, from the second application and at the first application, wake word enrollment data indicating the wake word to be enrolled for wake word detection.

The process 800 may additionally, or alternatively, include receiving, from the second application, a second indication that second audio data does not include the wake word to a threshold confidence level and based at least in part on receiving the second indication, causing the second audio data to be removed from the electronic device.

The process 800 may additionally, or alternatively, include receiving input data representing an input associated with a request to enable wake word detection by the electronic device. The process 800 may also include causing, based at least in part on the input data, the wake word detection to be enabled.

Figure 9:
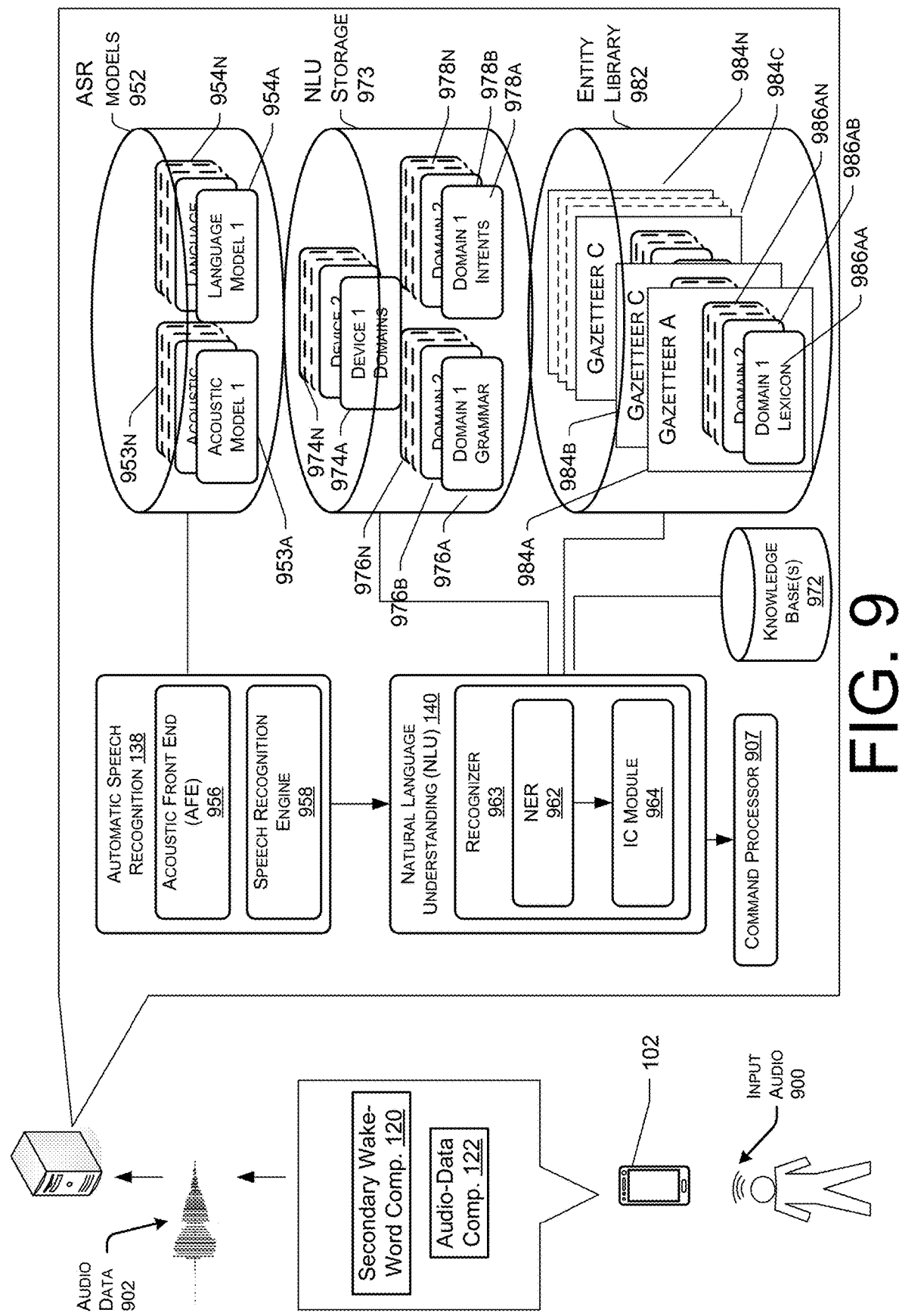
FIG. 9 illustrates a conceptual diagram of components of a speech processing system for processing audio data provided by one or more devices.

FIG. 9 illustrates a conceptual diagram of how a spoken utterance can be processed, allowing a system to capture and execute commands spoken by a user, such as spoken commands that may follow a wake word, or trigger expression, (i.e., a predefined word or phrase for "waking" a device, causing the device to begin sending audio data to a remote system, such as system 126). The various components illustrated may be located on a same or different physical devices. Communication between various components illustrated in FIG. 9 may occur directly or across a network 128. An audio capture component, such as a microphone 110 of the device 102, or another device, captures audio 900 corresponding to a spoken utterance. The device 102, using a wake word component 120, then processes audio data corresponding to the audio 900 to determine if a keyword (such as a wake word) is detected in the audio data.

Following detection of a wake word, the device 102 sends audio data 902 corresponding to the utterance to the remote system 126 that includes an ASR module 138. The audio data 902 may be output from an optional acoustic front end (AFE) 956 located on the device prior to transmission. The AFE 956 may be a component of the audio-data component 122, described with respect to FIG. 1. In other instances, the audio data 902 may be in a different form for processing by a remote AFE 956, such as the AFE 956 located with the ASR module 138 of the remote system 126.

The wake word component 120 works in conjunction with other components of the user device, for example a microphone to detect keywords in audio 900. For example, the device may convert audio 900 into audio data, and process the audio data with the wake word component 120 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake word component 120 to perform wake word detection to determine when a user intends to speak a command to the user device. This process may also be referred to as keyword detection, with the wake word being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word component 120 may compare audio data to stored models or data to detect a wake word. One approach for wake word detection applies general large vocabulary continuous speech recognition (LVCSR) systems to decode the audio signals, with wake word searching conducted in the resulting lattices or confusion networks. LVCSR decoding may require relatively high computational resources. Another approach for wake word spotting builds hidden Markov models (HMM) for each key wake word and non-wake word speech signals respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wake word spotting system may be built on deep neural network (DNN)/recursive neural network (RNN) structures directly, without HMM involved. Such a system may estimate the posteriors of wake words with context information, either by stacking frames within a context window for DNN, or using RNN. Following-on posterior threshold tuning or smoothing is applied for decision making. Other techniques for wake word detection, such as those known in the art, may also be used.

Once the wake word is detected, the local device 102 may begin transmitting audio data 902 corresponding to input audio 900 to the remote system 126 for speech processing. Audio data corresponding to that audio may be sent to remote system 126 for routing to a recipient device or may be sent to the remote system 126 for speech processing for interpretation of the included speech (either for purposes of enabling voice-communications and/or for purposes of executing a command in the speech). The audio data 902 may include data corresponding to the wake word, or the portion of the audio data corresponding to the wake word may be removed by the local device 102 prior to sending. Upon receipt by the remote system 126, an ASR module 138 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 138 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 126 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Song A" or "Alexa, play Movie B on the television." The wake detection module may identify the wake word, otherwise described as a trigger expression, "Alexa," in the user utterance and may "wake" based on identifying the wake word. Audio data corresponding to the user utterance may be sent to the remote system 126, where the speech recognition engine 958 may identify, determine, and/or generate text data corresponding to the user utterance, here "play Song A" or "play Movie B on the television."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing 140 (e.g., server 126) may include various components, including potentially dedicated processor(s), memory, storage, etc. As shown in FIG. 9, an NLU component 140 may include a recognizer 963 that includes a named entity recognition (NER) module 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 138 based on the utterance input audio 900) and attempts to make a semantic interpretation of the text. That is, the NLU process determines the meaning behind the text based on the individual words and then implements that meaning. NLU processing 140 interprets a text string to derive an intent or a desired action from the user as well as the pertinent pieces of information in the text that allow a device (e.g., device 102) to complete that action. For example, if a spoken utterance is processed using ASR 138 and outputs the text "play Song A" the NLU process may determine that the user intended to have audio corresponding to Song A output by the device.

The NLU may process several textual inputs related to the same utterance. For example, if the ASR 138 outputs N text segments (as part of an N-best list), the NLU may process all N outputs to obtain NLU results.

As will be discussed further below, the NLU process may be configured to parse and tag to annotate text as part of NLU processing. For example, for the text "play Song A," "play" may be tagged as a command (to output audio) and "Song A" may be tagged as the identifier of the audio to be output.

To correctly perform NLU processing of speech input, an NLU process 140 may be configured to determine a "domain" of the utterance so as to determine and narrow down which services offered by the endpoint device (e.g., remote system 126 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU module 140 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 964 parses the query to determine an intent or intents for each identified domain, where the intent corresponds to the action to be performed that is responsive to the query. Each domain is associated with a database (978a-978n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 964 identifies potential intents for each identified domain by comparing words in the query to the words and phrases in the intents database 978. In some instances, the determination of an intent by the IC module 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play Song A" is an identified intent, a grammar (976) framework or frameworks may correspond to sentence structures such as "play {Song A}."

For example, the NER module 962 may parse the query to identify words as subject, object, verb, preposition, etc., based on grammar rules and/or models, prior to recognizing named entities. The identified verb may be used by the IC module 964 to identify intent, which is then used by the NER module 962 to identify frameworks. A framework for the intent of "play a song," meanwhile, may specify a list of slots/fields applicable to play the identified "song" and any object modifier (e.g., specifying a music collection from which the song should be accessed) or the like. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 962 may search the database of generic words associated with the domain (in the knowledge base 972). So, for instance, if the query was "play Song A," after failing to determine which song to play, the NER component 962 may search the domain vocabulary for the phrase "Song A". In the alternative, generic words may be checked before the gazetteer information, or both may be tried, potentially producing two different results.

The output data from the NLU processing (which may include tagged text, commands, etc.) may then be sent to a command processor 907. The destination command processor 907 may be determined based on the NLU output. For example, if the NLU output includes a command to send a message, the destination command processor 907 may be a message sending application, such as one located on the user device or in a message sending appliance, configured to execute a message sending command. If the NLU output includes a search request, the destination command processor 907 may include a search engine processor, such as one located on a search server, configured to execute a search command. After the appropriate command is generated based on the intent of the user, the command processor 907 may provide some or all of this information to a text-to-speech (TTS) engine 142. The TTS engine 142 may then generate an actual audio file for outputting the audio data determined by the command processor 907 (e.g., "account successfully linked," or "try your request again"). After generating the file (or "audio data"), the TTS engine 142 may provide this data back to the remote system 126.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 140 during runtime operations where NLU operations are performed on text (such as text output from an ASR component 138). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC module 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 126 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 126, as illustrated herein are exemplary, and may be located in a stand-alone device or may be included, in whole or in part, as a component of a larger device or system, may be distributed across a network or multiple devices connected by a network, etc.

Figure 10:
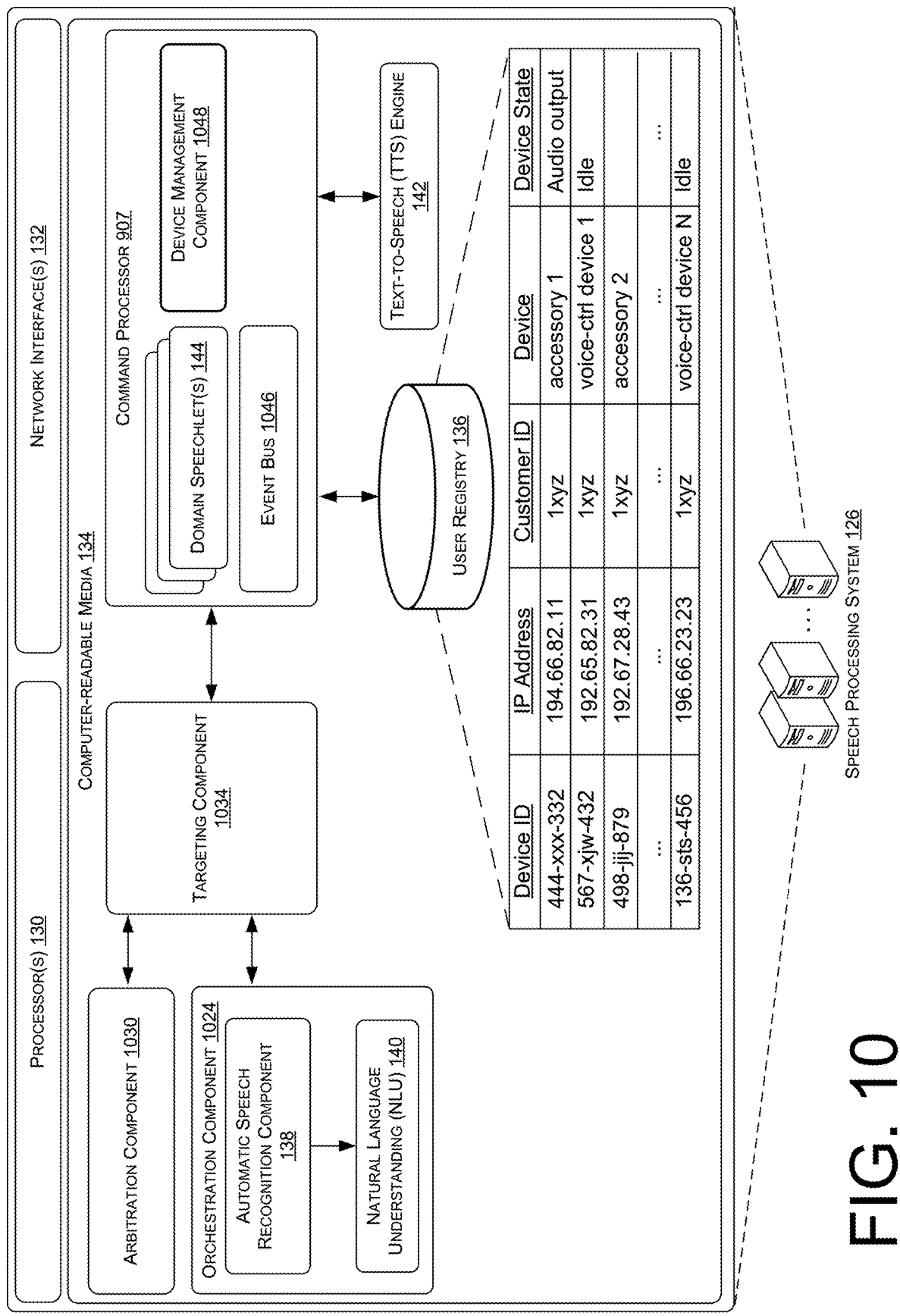
FIG. 10 illustrates a conceptual diagram of components of a speech processing system for processing audio data provided by a device that has been configured for wake word detection.

FIG. 10 illustrates a conceptual diagram of components of a speech processing system 126 associating audio output commands with multiple devices, including a command processor 907 configured to generate a command that the selected device uses to respond to a user utterance. As used with respect to FIG. 10, a device may include a device 102, such as described with respect to FIG. 1. As illustrated in FIG. 10, the speech processing system 126, including the orchestration component 1024 comprising the ASR component 138 and the NLU component 140, may be coupled to the targeting component 1034 and provide the targeting component 1034 with the intent determined to be expressed in the user utterance. Further, the arbitration component 1030 may provide the ranked list of devices to the targeting component 1034, as well as device indicators (e.g., IP addresses, devices names, etc.) for one or more of the devices in the ranked list of devices. The targeting component 1034 may then perform techniques to determine a target device (e.g., a device to perform the requested operation), and provide various data to the command processor 907. For instance, the targeting component 1034 may provide the command processor 907 with various device identifiers of the devices, the determined target device, the determined intent and/or command, etc. By way of example, the targeting component 1034 may determine which devices to add to a grouping of device, which devices to remove from a grouping of devices, and/or which devices to move an audio-session to. The association and dissociation of device states and/or audio-session queues using the targeting component 1034 is described in more detail with respect to FIG. 1, above.

The command processor 907 and/or NLU component 140 may determine a domain based on the intent and, based on this determination, route the request corresponding to the audio data to the appropriate domain speechlet, such as the illustrated domain speechlets 144. The domain speechlet 144 may comprise any type of device or group of devices (e.g., hardware device, virtual devices or partitions, server, etc.), and may receive the text data and/or an intent associated with the audio signals and may determine how to respond to the request. For instance, the intent for a command "play Song A" may be routed to a music domain speechlet 144, which controls generation of directive data for sending to devices for outputting audio corresponding to songs.

Various types of domain speechlets 144 may be used to determine which devices to send commands to and/or to use in response to a user utterance, as well as the appropriate response and potential additional content (e.g., audio data). For example, the domain speechlets 144 may include a third party skills domain speechlet 144, which may handle intents associated with gaming, productivity, etc., a music domain speechlet 144, which may handle intents associated with music play requests (e.g., Amazon Music, Pandora, Spotify, iHeart, etc.), and/or an information domain speechlet 144, which may handle requests for information associated, for example, with the status of a particular device and/or content being utilized and/or output by a particular device and/or group of devices.

After the domain speechlet 144 generates the appropriate command, which may be described herein as directive data, based on the intent of the user, and/or provides additional content, such as audio data, to be output by one of the devices, the domain speechlet 144 may provide this information back to the speech system 126, which in turns provides some or all of this information to a text-to-speech (TTS) engine 142. The TTS engine 142 then generates an actual audio file for outputting the second audio data determined by the domain speechlet 144. After generating the file (or "audio data"), the TTS engine 142 may provide this data back to the speech system 126.

The speech system 126 may then publish (i.e., write) some or all of this information to an event bus 1046. That is, the speech system 126 may provide information regarding the initial request (e.g., the speech, the text, the domain/intent, etc.), the response to be provided to the device, or any other information pertinent to the interaction between the device and the speech processing system 126 to the event bus 1046.

Within the speech processing system 126, one or more components or services may subscribe to the event bus 1046 so as to receive information regarding interactions between user devices and the speech processing system 126. In the illustrated example, for instance, the device management component 1048 may subscribe to the event bus 1046 and, thus, may monitor information regarding these interactions. In some examples, monitoring information in the event bus 1046 may comprise communications between various components of the speech processing system 126. For example, the targeting component 1034 may monitor the event bus 1046 to identify device state data for devices. In some examples, the event bus 1046 may "push" or send indications of events and/or device state data to the targeting component 1034. Additionally, or alternatively, the event bus 1046 may be "pulled" where the targeting component 1034 sends requests to the event bus 1046 to provide an indication of device state data for a device. The event bus 1046 may store indications of the device states for the devices, such as in a database (e.g., user registry 136), and using the stored indications of the device states, send the device state data for devices to the targeting component 1034. Thus, to identify device state data for a device, the targeting component 1034 may send a request to the event bus 1046 (e.g., event component) to provide an indication of the device state data associated with a device, and receive, from the event bus 1046, the device state data that was requested.

The device management component 1048 functions to monitor information published to the event bus 1046 and identify events that may trigger action. For instance, the device management component 1048 may identify (e.g., by filtering) those events that: (i) come from devices that are associated with secondary device(s) (e.g., have secondary devices in their environments such as televisions, personal computing devices, accessory devices, etc.), and (ii) are associated with supplemental content (e.g., image data, video data, etc.). The device management component 1048 may reference the user registry 136 to determine which devices are associated with secondary devices, as well as determine device types, states, and other capabilities of these secondary devices. For instance, the device management component 1048 may determine, from the information published to the event bus 1046, an identifier associated with the device making the corresponding request or the device selected to respond to or act upon the user utterance. The device management component 1048 may use this identifier to identify, from the user registry 136, a user account associated with the device. The device management component 1048 may also determine whether any secondary devices have been registered with the identified user account, as well as capabilities of any such secondary devices, such as how the secondary devices are configured to communicate (e.g., using WiFi, short-range wireless connections, etc.), the type of content the devices are able to output (e.g., audio, video, still images, flashing lights, etc.), and the like.

The device management component 1048 may determine whether a particular event identified is associated with supplemental content. That is, the device management component 1048 may write, to a datastore, indications of which types of events and/or which primary content or responses are associated with supplemental content. In some instances, the speech processing system 126 may provide access to third-party developers to allow the developers to register supplemental content for output on secondary devices for particular events and/or primary content. For example, if a device is to output that the weather will include thunder and lightning, the device management component 1048 may store an indication of supplemental content such as thunder sounds, pictures/animations of lightning and the like. In another example, if a device is outputting information about a particular fact (e.g., "a blue whale is the largest mammal on earth . . . "), then a secondary device, such as television, may be configured to provide supplemental content such as a video or picture of a blue whale. In another example, if a device is outputting audio, then a second device, such as a speaker, may be configured to also output the audio based at least in part on a user utterance representing a request to add the secondary device to the audio session. In these and other examples, the device management component 1048 may store an association between the primary response or content (e.g., outputting of information regarding the world's largest mammal) and corresponding supplemental content (e.g., the audio data, image data, or the like). In some instances, the device management component 1048 may also indicate which types of secondary devices are to output which supplemental content. For instance, in the instant example, the device management component 1048 may store an indication that secondary devices of a class type "tablet" are to output a picture of a blue whale. In these and other instances, meanwhile, the device management component 1048 may store the supplemental content in association with secondary-device capabilities (e.g., devices with speakers output the audio commentary, devices with screens output the image, etc.).

The device management component 1048 may also determine how to transmit response and/or supplement content (and/or information acquiring the content) to the devices and/or the secondary devices. To make this determination, the device management component 1048 may determine a device type of the devices and/or secondary devices, capabilities of the device(s), or the like, potentially as stored in the user registry 136. In some instances, the device management component 1048 may determine that a particular device is able to communicate directly with the speech processing system 126 (e.g., over WiFi) and, thus, the device management component 1048 may provide the response and/or content directly over a network 128 to the secondary device (potentially by the speech system 126). In another example, the device management component 1048 may determine that a particular secondary device is unable to communicate directly with the speech processing system 126, but instead is configured to communicate with a device in its environment over short-range wireless networks. As such, the device management component 1048 may provide the supplement content (or information) to the speech system 126, which in turn may send this to the device, which may send the information over a short-range network to the secondary device.

The computer-readable media 134 may further include the user registry 136 that includes data regarding user profiles as described herein. The user registry 136 may be located part of, or proximate to, the speech processing system 126, or may otherwise be in communication with various components, for example over the network 128. The user registry 136 may include a variety of information related to individual users, accounts, etc. that interact with the devices, and the speech processing system 126. For illustration, the user registry 136 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 136 may store indications of associations between various devices and/or secondary device, such as virtual clusters of devices, states of devices, and associations between devices and audio-session queues. The user registry 136 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 907 and/or the domain speechlets 144 may determine, based on the stored device states in the user registry 136, a current device state of the devices. Rather than receiving device states for the devices, in metadata, the device states may already have been determined or received and stored in the user registry 136. Further, the user registry 136 may provide indications of various permission levels depending on the user. As an example, the speech system 126 may perform speaker recognition on audio signals to determine an identity of the speaker. If the speaker is a child, for instance, the child profile may have permission restrictions where they are unable to request audio to be output by certain devices and/or to output certain audio on one or more of the devices, for example. Conversely, a parent profile may be able to direct output of audio without restrictions.

In some examples, to determine the device state, the event bus 1046 may publish different events which indicate device states to various entities or components that subscribe to the event bus 1046. For instance, if an event of "play Song A" occurs for a device, the event bus 1046 may publish the indication of this event, and thus the device state of the device from which the audio data was received may be determined. Thus, various components, such as the targeting component 1034, may be provided with indications of the various device states by the event bus 1046. The event bus 1046 may further store and/or update device states for the devices in the user registry 136. The components of the speech processing system 126 may query the user registry 136 to determine device states.

A particular user profile may include a variety of data that may be used by the system 126. For example, a user profile may include information about what devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   computer-readable media storing first computer-executable instructions that, when executed by the one or more processors, cause the one or more processors to perform operations comprising:
   receiving, from a digital-signal-processor component residing on an electronic device configured with a microphone to capture audio representing a first user utterance and generate corresponding first audio data, a first indication that a digital signal processor associated with the digital-signal processor application has detected a wake word from the first audio data;
   determining that a speech-processing application associated with a remote speech-processing system is absent from the electronic device;
   causing the electronic device to install the speech-processing application;
   receiving, from the digital-signal-processor component, a second indication that the digital signal processor has detected the wake word from second audio data corresponding to a second user utterance;
   determining that the speech-processing application is installed on the electronic device;
   receiving, from the digital signal processor, the second audio data; and
   in response to determining that the speech-processing application has been installed, sending the audio data to the speech-processing application for speech processing by the remote speech-processing system.

2. The system of claim 1, further comprising the speech-processing application, wherein the speech-processing application is configured with second computer-executable instructions that, when executed by the one or more processors, causes the one or more processors to perform operations comprising:
   receiving the second audio data;
   determining that at least a portion of the second audio data represents the wake word to a threshold confidence level;
   in response to determining that the at least the portion of the second audio data represents the wake word, sending the audio data to the remote speech-processing system for speech processing; and
   receiving, from the remote speech-processing system, a response associated with the second audio data.

3. The system of claim 1, further comprising the speech-processing application, wherein the speech-processing application is configured with second computer-executable instructions that, when executed by the one or more processors, causes the one or more processors to perform operations comprising:
   receiving input data representing an input associated with a control setting displayed using the speech-processing application, the input indicating selection of an option to disable wake word detection by the electronic device;
   sending, using the speech-processing application and based at least in part on receiving the input data, an instruction to disable the wake word detection to the digital-signal-processor component;
   causing, using the digital-signal-processor component and based at least in part on the instruction, the wake word detection to be disabled.

4. The system of claim 1, the operations further comprising receiving, from the speech-processing application and at the digital-signal-processor component, wake word enrollment data indicating the wake word to be enrolled for wake word detection.

5. A method, comprising:
   receiving, from a first application associated with an electronic device, a first indication that a wake word has been detected from first audio data representing a first user utterance;
   determining, using the first application, that a second application associated with a speech-processing system is absent from the electronic device; and
   based at least in part on determining that the second application is absent from the electronic device, causing the electronic device to install the second application.

6. The method of claim 5, further comprising:
   receiving, from the first application and at the second application, second audio data;
   determining, using the second application, that a portion of the second audio data represents the wake word;
   based at least in part on determining that the portion of the second audio data represents the wake word, sending, using the second application, the second audio data to the speech-processing system; and
   receiving, from the speech-processing system, a response associated with the second audio data.

7. The method of claim 5, further comprising:
   receiving input data representing an input associated with the control setting displayed using the second application, the input indicating selection of an option to disable wake word detection by the electronic device;
   sending, using the second application and based at least in part on receiving the input data, an instruction to disable the wake word detection to the first application;
   causing, using the first application and based at least in part on the instruction, the wake word detection to be disabled.

8. The method of claim 5, further comprising receiving, from the second application and at the first application, wake word enrollment data indicating the wake word to be enrolled for wake word detection.

9. The method of claim 5, wherein causing the electronic device to install the second application comprises causing the electronic device to install the second application based at least in part on receiving input data representing input associated with a notification that the second application is to be downloaded to facilitate speech processing, the notification associated with a selectable portion that, when selected, causes an application store to be presented that is configured to facilitate downloading of the second application.

10. The method of claim 5, further comprising:
    receiving second audio data representing a second user utterance;

receiving, from the second application, a second indication that the second audio data does not include the wake word to a threshold confidence level; and based at least in part on receiving the second indication, causing the second audio data to be removed from the electronic device.

11. The method of claim 5, further comprising:

receiving input data representing an input associated with a request to enable wake word detection by the electronic device; and wherein causing the electronic device to install the second application is based at least in part on receiving the input data.

12. The method of claim 5, further comprising:

identifying status data associated with the electronic device, the status data including at least one of:
  capability data indicating that the electronic device is hands-free capable;
  wake word detection state data indicating that wake word detection is enabled or disabled on the electronic device; or
  language data indicating a language that the electronic device is configured to operate in; and sending, to the second application, the status data.

13. A device, comprising:

a digital signal processor configured to receive audio data representing a user utterance;

a wake word engine configured to:
  cause the digital signal processor to detect, from the audio data, a wake word; and
  send, to a wake word client, an indication that the wake word has been detected;

the wake word client configured to:
  determine that a second application associated with a speech-processing system is absent from the device; and
  based at least in part on the second application being absent from the electronic device, cause the device to install the second application.

14. The device of claim 13, wherein the audio data comprises first audio data, the user utterance comprises a first user utterance, and wherein:

the digital signal processor is further configured to receive second audio data representing a second user utterance;

the wake word engine is further configured to:
  cause the digital signal processor to detect, from the second audio data, the wake word; and
  send, to the wake word client, the indication that the wake word has been detected;

the wake word client is further configured to:
  determine that the second application is installed on the device; and
  based at least in part on determining that the second application has been installed, send the second audio data to the second application.

15. The device of claim 14, further comprising the second application, wherein the second application is configured with computer-executable instructions that, when executed by one or more processors, causes the one or more processors to perform operations comprising:

receiving, from the first application, second audio data;

determining that a portion of the second audio data represents the wake word to a threshold confidence level;

based at least in part on determining that the portion of the second audio data represents the wake word, sending the second audio data to the speech-processing system; and receiving, from the speech-processing system, a response associated with the second audio data.

16. The device of claim 13, the wake word client further configured to receive, from the second application, wake word enrollment data indicating the wake word to be enrolled for wake word detection.

17. The device of claim 13, wherein causing the device to install the second application comprises causing the device to install the second application based at least in part on receiving input data representing input associated with a notification that the second application is to be downloaded to facilitate speech processing, the notification associated with a selectable portion that, when selected, causes an application store to be presented that is configured to facilitate downloading of the second application.

18. The device of claim 13, wherein the indication comprises a first indication, and the wake word engine further configured to:

receive, from the second application, a second indication that second audio data does not include the wake word to a threshold confidence level; and based at least in part on receiving the second indication, causing the second audio data to be removed from the device.

19. The device of claim 13, wherein the indication comprises a first indication, and the wake word client further configured to:

receiving input data representing an input associated with a request to enable wake word detection by the electronic device; and wherein causing the device to install the second application is based at least in part on receiving the input data.

20. The device of claim 13, the wake word client further configured to:

send, to the second application, status data associated with the device, the status data including at least one of:
  capability data indicating that the device is hands-free capable;
  wake word detection state data indicating that wake word detection is enabled or disabled on the device; or
  language data indicating a language that the device is configured to operate in; and sending, to the second application, the status data.

* * * * *